(12) United States Patent
Fountain et al.

(10) Patent No.: US 10,747,573 B2
(45) Date of Patent: Aug. 18, 2020

(54) VIRTUALIZED EXECUTION ACROSS DISTRIBUTED NODES

(71) Applicant: UST GLOBAL (SINGAPORE) PTE. LTD., Singapore (SG)

(72) Inventors: Thomas C. Fountain, Madison, NJ (US); Simon Byford Moss, Cos Cob, CT (US); Elizabeth Winters Elkins, Pompano Beach, FL (US)

(73) Assignee: UST GLOBAL (SINGAPORE) PTE. LTD., Singapore (SG)

( * ) Notice: Subject to any disclaimer, the term of this patent is extended or adjusted under 35 U.S.C. 154(b) by 95 days.

(21) Appl. No.: 15/324,554

(22) PCT Filed: Jul. 8, 2015

(86) PCT No.: PCT/US2015/039621
§ 371 (c)(1),
(2) Date: Jan. 6, 2017

(87) PCT Pub. No.: WO2016/007679
PCT Pub. Date: Jan. 14, 2016

(65) Prior Publication Data
US 2017/0199757 A1    Jul. 13, 2017

Related U.S. Application Data

(60) Provisional application No. 62/022,082, filed on Jul. 8, 2014.

(51) Int. Cl.
*G06F 9/46* (2006.01)
*G06F 9/455* (2018.01)
(Continued)

(52) U.S. Cl.
CPC .............. *G06F 9/466* (2013.01); *G06F 9/455* (2013.01); *G06F 9/4881* (2013.01);
(Continued)

(58) Field of Classification Search
None
See application file for complete search history.

(56) References Cited

U.S. PATENT DOCUMENTS 7,401,112 B1 * 7/2008 Matz ..................... G06F 9/5038
379/265.02
2008/0155100 A1    6/2008 Ahmed et al.
(Continued)

OTHER PUBLICATIONS

International Searching Authority, Notification of Transmittal of the International Search Report and the Written Opinion of the International Searching Authority, or the Declaration issued in International Application No. PCT/US15/39621 dated Oct. 6, 2015.
(Continued)

*Primary Examiner* — Duy Khuong T Nguyen
*Assistant Examiner* — Melissa A Headly
(74) *Attorney, Agent, or Firm* — Nixon Peabody LLP

(57) ABSTRACT

A non-volatile computer readable medium includes computer program instructions to cause a computing device to perform steps in a process. The process comprises detecting an occurrence of an originating event; selecting, in response to the occurrence of the originating event, a unit of work from a queue; selecting, based at least in part on an identification script, a network available to accept the unit of work; sending the unit of work to a first configurable worker object in the network that encapsulates an application function capable of performing a processing task; processing the unit of work by the first configurable worker object; and indicating, by the first configurable worker object, that the unit of work has been processed.

23 Claims, 18 Drawing Sheets

(51) Int. Cl.
    *G06Q 10/06*    (2012.01)
    *G06Q 10/00*    (2012.01)
    *G06F 9/48*    (2006.01)
    *G06F 9/50*    (2006.01)

(52) U.S. Cl.
    CPC ........... *G06F 9/5083* (2013.01); *G06Q 10/00* (2013.01); *G06Q 10/06* (2013.01); *G06Q 10/067* (2013.01)

(56) References Cited

U.S. PATENT DOCUMENTS

| | | | |
|---|---|---|---|
| 2011/0041136 A1* | 2/2011 | Messier | G06F 9/5066 718/105 |
| 2011/0307290 A1* | 12/2011 | Rolia | G06Q 10/06 705/7.25 |
| 2013/0145367 A1 | 6/2013 | Moss et al. | |
| 2014/0181817 A1 | 6/2014 | Muller et al. | |
| 2014/0373021 A1* | 12/2014 | Teixeira | G06F 9/5038 718/103 |

OTHER PUBLICATIONS

International Searching Authority, Written Opinion of the International Searching Authority issued in International Application No. PCT/US15/39621 dated Oct. 6, 2015.

The International Bureau of WIPO, International Preliminary Report on Patentability issued in International Application No. PCT/US15/39621 dated Sep. 14, 2015.

\* cited by examiner

VIRTUALIZED EXECUTION ACROSS DISTRIBUTED NODES

CROSS REFERENCE TO RELATED APPLICATIONS

This application claims priority to and the full benefit of U.S. Provisional Patent application 62/022,082, filed Jul. 8, 2014, which is incorporated by reference.

BACKGROUND

A company gradually accumulates data sources, software applications, technology and analytics solutions, and source systems that are often siloed and do not interact with one another. However, the information and analysis needed to address a new and immediate intelligence need of the business are often distributed across those siloed source systems. A company has traditionally used centralized approaches to solve these distributed business problems. The traditional methods of centralizing data and analysis with multi-year data warehousing and integration projects are expensive, inefficient, and unpredictable.

While the specific distributed business problems a company attempts to solve are different and generally particularized to its immediate information needs, certain common denominators exist when implementing a solution in the traditional way. In this approach, data is first centralized into a common storage location that disconnects it from its source system. From there, analytics are applied, creating another level of abstraction from the physical reality of the source system. After multiple such projects, it is difficult to comprehend the original physical structure.

Much cost, time, and risk must be borne to perform this sort of integration of decentralized source systems prior to responding to the immediate business information needs. Data integration and centralization, and their attendant infrastructure costs, must be repeated for implementation of every new business solution, slowing business agility and institutionalizing unnecessary cost. This is due in large part to the necessity of converting the logical design of the desired business intelligence process to the centralized system required to support the logic. Current application project value is either replaced or requires significant rewrites or upgrades every four to six years. Data projects decline in value even more quickly.

As companies and enterprises grow and become more complex, so does the cost, delay, risk, and repetition of the traditional centralized business solutions. The burden of implementing a business solution in the traditional way fundamentally undermines effectiveness of an enterprise. A new approach to solving these distributed business problems is needed.

SUMMARY

A non-volatile computer readable medium including computer program instructions to cause a computing device to perform steps in a process is presented, with the process comprising: detecting an occurrence of an originating event; selecting, in response to the occurrence of the originating event, a unit of work from a queue; selecting, based at least in part on an identification script, a network available to accept the unit of work; sending the unit of work to a first configurable worker object in the network that encapsulates an application function capable of performing a processing task; processing the unit of work by the first configurable worker object; and indicating, by the first configurable worker object, that the unit of work has been processed. The process may further comprise sending the unit of work to a second configurable worker object for further processing. The process may further comprise indicating that processing of the unit of work has been completed. The process may yet further comprise sending results of completed processing to a requesting object. The unit of work may be part of a multi-step data processing transaction.

An asynchronous, event-driven process for data processing is presented that comprises: detecting an occurrence of an originating event on a computing system; selecting, in response to the occurrence of the originating event, a unit of work from a queue; selecting, based at least in part on an identification script, a network available to accept the unit of work; sending the unit of work to a first configurable worker object in the network that encapsulates an application function capable of performing a processing task; processing the unit of work by the first configurable worker object; and indicating, by the first configurable worker object, that the unit of work has been processed. The process may further comprise sending the unit of work to a second configurable worker object for further processing. The process may further comprise indicating that processing of the unit of work has been completed. The process may yet further comprise sending results of completed processing to a requesting object. The unit of work may be part of a multi-step data processing transaction.

A non-volatile computer readable medium including computer program instructions to cause a computing device to perform steps in a process is presented, with the process comprising: detecting an occurrence of an originating event on a computing system; selecting, in response to the occurrence of the originating event, a unit of work from a queue; selecting, based at least in part on an identification script, a network available to accept the unit of work; sending the unit of work to a first configurable worker object in the network that encapsulates an application function capable of performing a processing task; determining whether processing of the unit of work by the first configurable worker object depends upon completion of processing by a second configurable worker object; processing the unit of work by the first configurable worker object; and indicating, by the first configurable worker object, that the unit of work has been processed. The process may further comprise assigning a transaction identifier to the unit of work. The process may further comprise sending the unit of work to a third configurable work object for further processing. The process may further comprise indicating that processing of the unit of work has been completed. The process may still further comprise sending results of completed processing to a requesting object. The unit of work may be part of a multi-step data processing transaction.

An asynchronous, event-driven process for processing data is presented that comprises: detecting an occurrence of an originating event; selecting, in response to the occurrence of the originating event, a unit of work from a queue; selecting, based at least in part on an identification script, a network available to accept the unit of work; sending the unit of work to a first configurable worker object in the network that encapsulates an application function capable of performing a processing task; determining whether processing of the unit of work by the first configurable worker object depends upon completion of processing by a second configurable worker object; processing the unit of work by the first configurable worker object; and indicating, by the first configurable worker object, that the unit of work has been processed. The process may further comprise assigning a transaction identifier to the unit of work. The process may further comprise sending the unit of work to a third configurable work object for further processing. The process may further comprise indicating that processing of the unit of work has been completed. The process may still further comprise sending results of completed processing to a requesting object. The unit of work may be part of a multi-step data processing transaction.

DETAILED DESCRIPTION

Implementations of the inventive system and method allow the creation, deployment, and operation of a non-invasive business software solution through the use of a set of discrete processing objects called neurons. The neurons execute with the support of a specialized runtime server called a cortex. There are many types of neurons, each type at execution performing a discrete information processing function. For each instance of a neuron, the performance of its information processing function may be influenced by a number of configurable properties. Instances of these configured neurons can be interconnected by users into networks such that the aggregate discrete information processing functions of the neurons in the network create a business solution capable of handling complex structures and functionality.

System Overview

Figure 1:
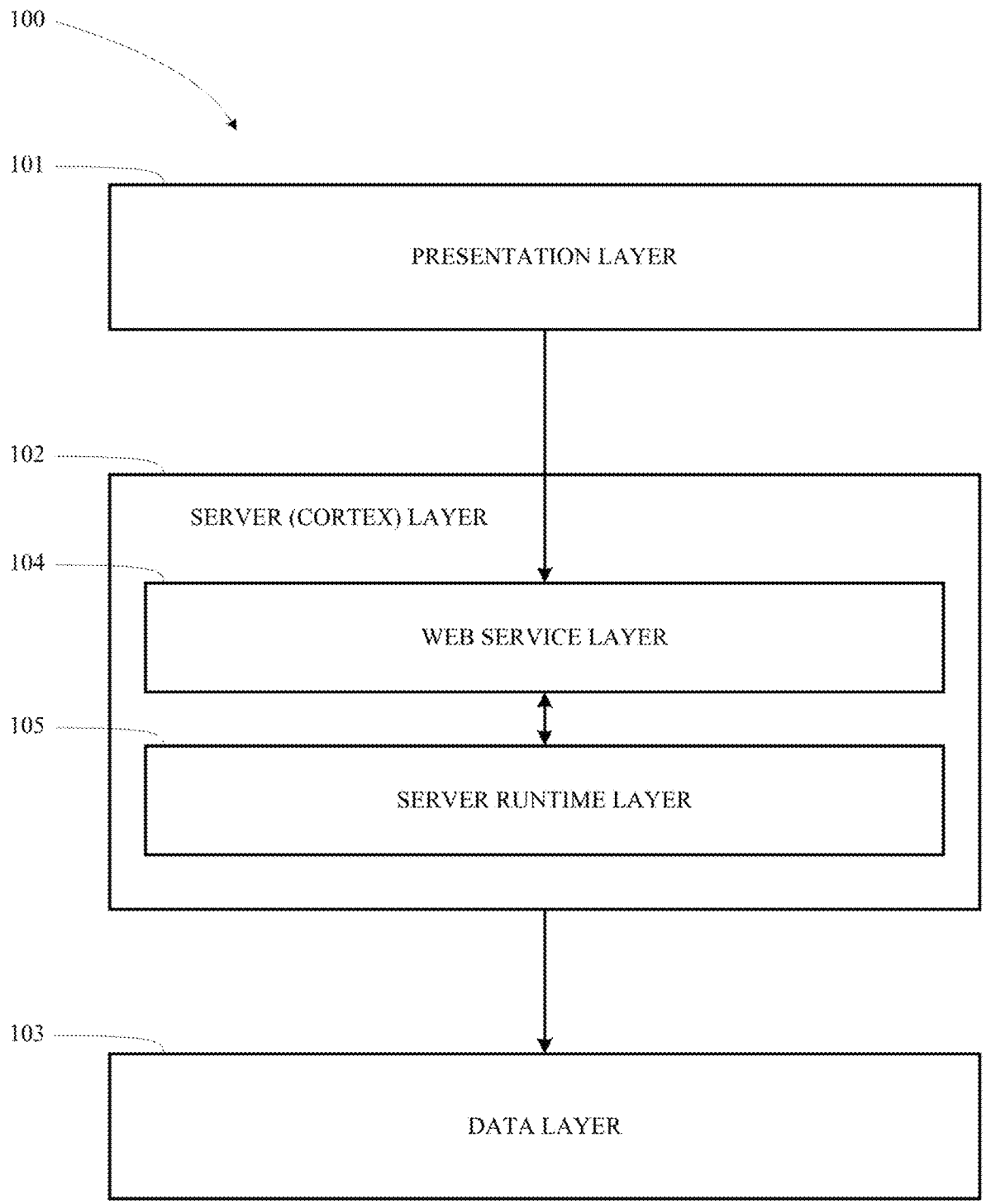
FIG. 1 is a block diagram overview of a system according to the present invention.

FIG. 1 is a block diagram overview of a system 100 for the operation of neurons according to the present invention. The system 100 is presented in conceptual view of three primary layers: presentation layer 101, server layer 102 (or "cortex"), and data layer 103. The presentation layer 101 contains the primary graphical user interfaces between users and the system 100. The server layer 102 contains the primary support functions of the system 100. Server layer 102 further contains web service layer 104, which provides services necessary to enable communications of server layer 102 with external entities, including presentation layer 101, and server runtime layer 105, which hosts operating neurons and provides services necessary to the performance of the information processing functions of hosted neurons. The data layer 104 contains configuration data for the system 100.

Figure 2:
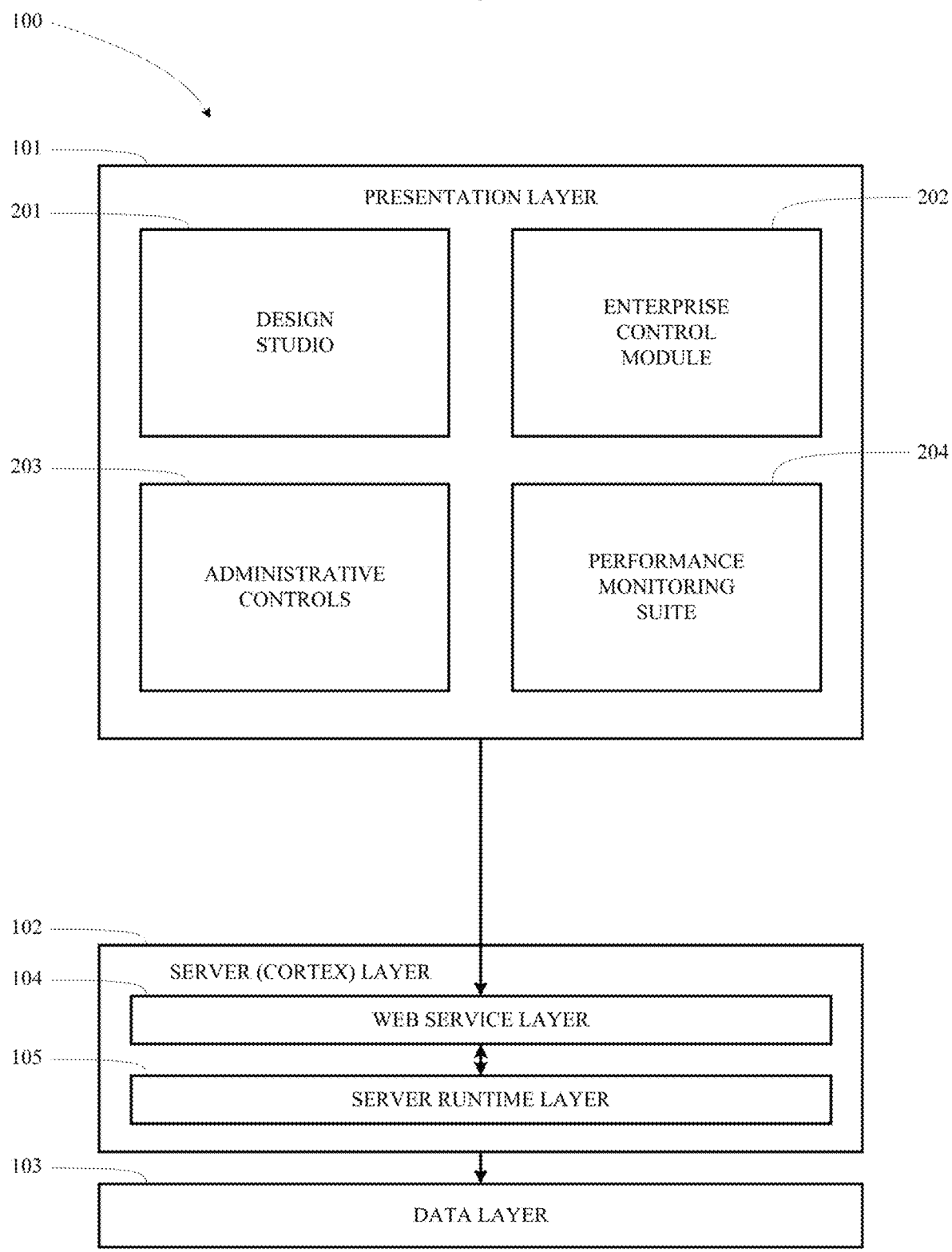
FIG. 2 is a block diagram overview of the system showing the presentation layer in further detail.

FIG. 2 is a block diagram overview of system 100 showing presentation layer 101 in further detail. The primary user interface services of system 100 are included in presentation layer 101: the design studio 201, the enterprise control manager (ECM) 202, the administrative control module 203, and the performance monitoring suite 204. Each of these interfaces may be one or more graphical user interfaces or terminal interfaces, and may be presented as web applications or system applications. User inputs in the presentation layer are provided to the web service layer 104 within server layer 102.

Design studio 201 is a graphical user interface that enables network designers to create, modify, deploy, and manage neuron networks, data source connections, and hosts within a private network or within a cloud computing environment. The design studio 201 may be configured to run on a web server in server layer 102 and operate in a thin client configuration.

Enterprise control manager 202 is a graphical user interface that enables users to configure a suite of intelligence visualization tools (widgets) with access to neuron network output data within system 100. Users may, through enterprise control manager 202, filter or modify neuron network output data to perform "what-if" analyses and recast results instantaneously; or directly edit neuron network inputs in order to apply real-time changes to business functions, use cases, and intelligence. Enterprise control manager 202 also includes report creation toolsets. The enterprise control manager 202 may be configured to run on a web server in server layer 102 and operate in a thin client configuration.

Administrative control module 203 is a user interface that enables administrators to create, modify or delete system 100 users, to control access and authorization, configure user privileges, create and manage groups, set up host servers and their properties, set up virtual machine realms and their properties, and define aliases for connecting to data sources, file systems and other locations. Administrative control module 203 also can be used to configure data sources and pre-defined SQL queries which may be used to populate widgets displayed in enterprise control manager 202. Administrative control module 203 may be configured to run on a web server in server layer 102 and operate in a thin client configuration.

Performance monitoring suite 204 is a set of application/network performance monitoring tools enabling users to view performance metrics of system 100 in operation.

Performance monitoring suite 204 may be any of a number of commercially available application performance management tools. Performance monitoring suite 204 may be configured to run on a web server in server layer 102 and operate in a thin client configuration.

Figure 3:
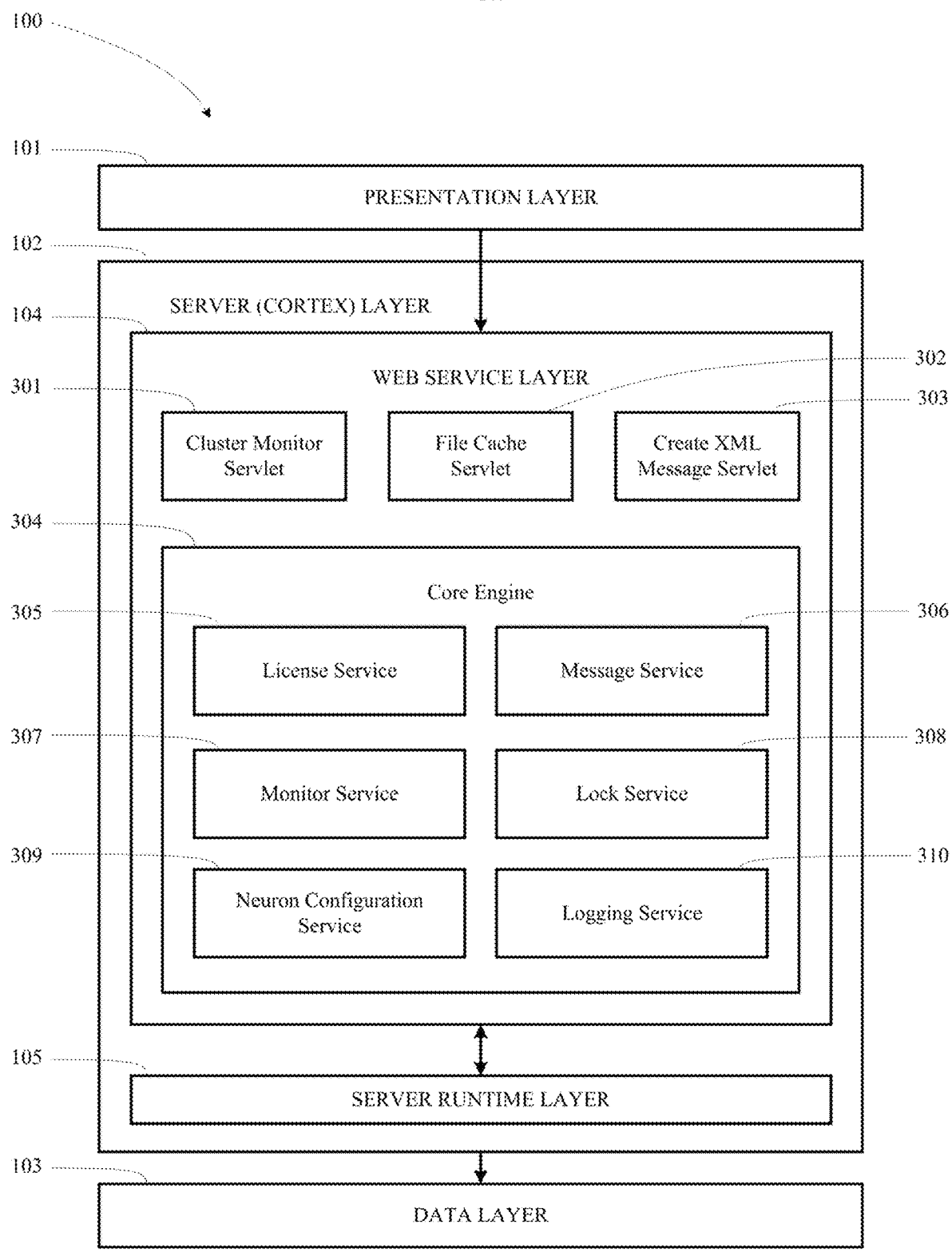
FIG. 3 is a block diagram overview of the system showing the server layer (cortex) and its component web service layer in further detail.

FIG. 3 is a block diagram overview of system 100 showing web service layer 104 of server layer 102 in further detail. Web service layer 104 includes a web server and servlet container, e.g. Eclipse Jetty, which manages various servlets, including the cluster monitor 301, file cache 302, and create XML message 303 servlets.

Web service layer 104 further includes a core engine 304 or web service framework including an XML based web services protocol stack, e.g. Apache Axis2, which supports the operation of various services, including license service 305, message service 306, monitor service 307, lock service 308, neuron configuration service 309, and logging service 310. License service 305 checks permissioned use of system 100 against externally assigned licensing limits. Message service 306 retrieves and passes messages between neurons within server layer 102, sends messages to other server layers (cortex) 102 operating on other hosts, and receives messages from such other server layers (cortex) 102 and passes them to neurons within server layer (cortex) 102. Monitor service 307 collects statistics about the performance of all elements of an instance of a server layer 102, in order to enable reporting on execution time and resource consumption. Lock service 308 prevents resource contention deadlocks, and allows access to a shared resource such as memory to only one system 100 component at any given time. When any one system 100 component accesses a shared resource, lock service 308 prohibits any other system 100 component from using that resource until the first system component has completed its use of that resource. Neuron configuration service 309 accepts requests to change a configuration of a neuron instance, and writes that change down to data layer 103. Logging service 310 captures alerts, alarms, and other system notifications within a server layer 102. Based on predetermined configuration by the administrator, logging service 310 then either reports the alarm, alert, or other notification to a predetermined destination, or packages the entire alert, alarm, or other notification and directs it to a predetermined location.

Figure 4:
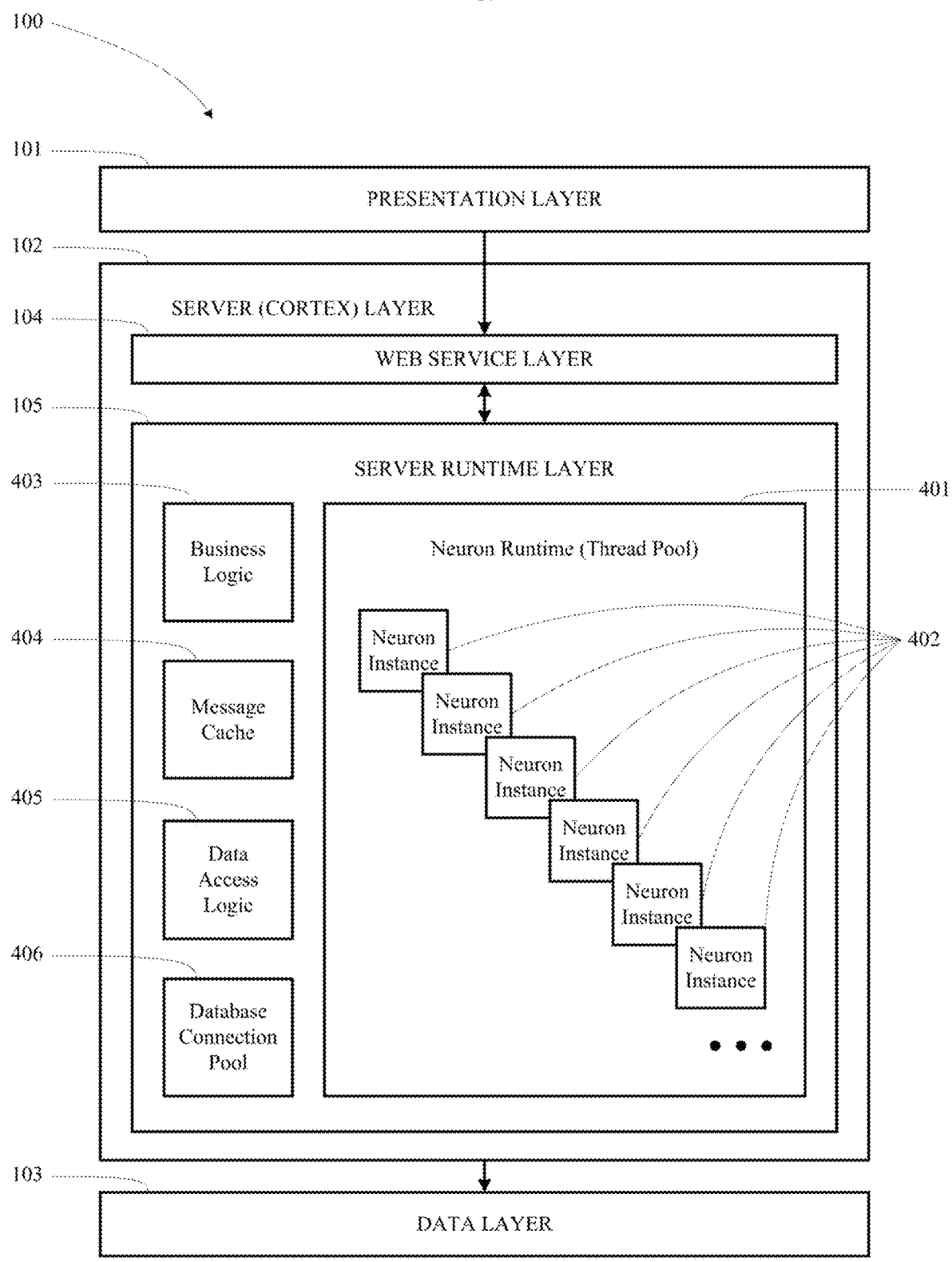
FIG. 4 is a block diagram overview of the system showing the server layer (cortex) and its component server runtime layer in further detail.

FIG. 4 is a block diagram overview of system 100 showing server runtime layer 105 of server layer 102 in further detail. Server runtime layer 105 hosts a execution manager 401 which manages a pool of available threads for the execution of individual neuron instances 402. Server runtime layer 105 also runs several services 403-406 that enable the execution of the neuron instances 402. These services include the business logic service 403, the message cache service 404, the data access logic service 405, and the database connection pool service 406.

At server runtime layer 105 startup, neuron configuration service 309 retrieves through database connection pool service 406 all configuration properties of all neuron instances configured to run within this instance of the server runtime from data layer 103, where configuration data for every neuron instance 402 is maintained, and caches them in a neuron configuration data store in local memory. This eliminates the latency of retrieving properties from the configuration database 501 at runtime.

Message service 306 handles all message routing within server layer 102. It further handles all message routing among cortexes (server layers) either through a web service with self-describing XML messages or by passing them through a third party JMS service.

Execution manager 401 provides an execution platform for runtime operation by allocating an execution thread to an individual neuron instance 402 when a message is received from message service 306 for that distinct neuron instance 402. When a message is received for a specific neuron instance 402, the execution manager 401 also retrieves that instance's 402 configured properties from the neuron configuration data store cached in local memory by neuron configuration service 309, then passes both those configured properties of the neuron instance 402 and the incoming message to the allocated execution thread for execution. Once execution of neuron instance 402 on the message concludes, execution manager 401 de-allocates the processing thread for use by other executing neuron instances 402.

Figure 5:
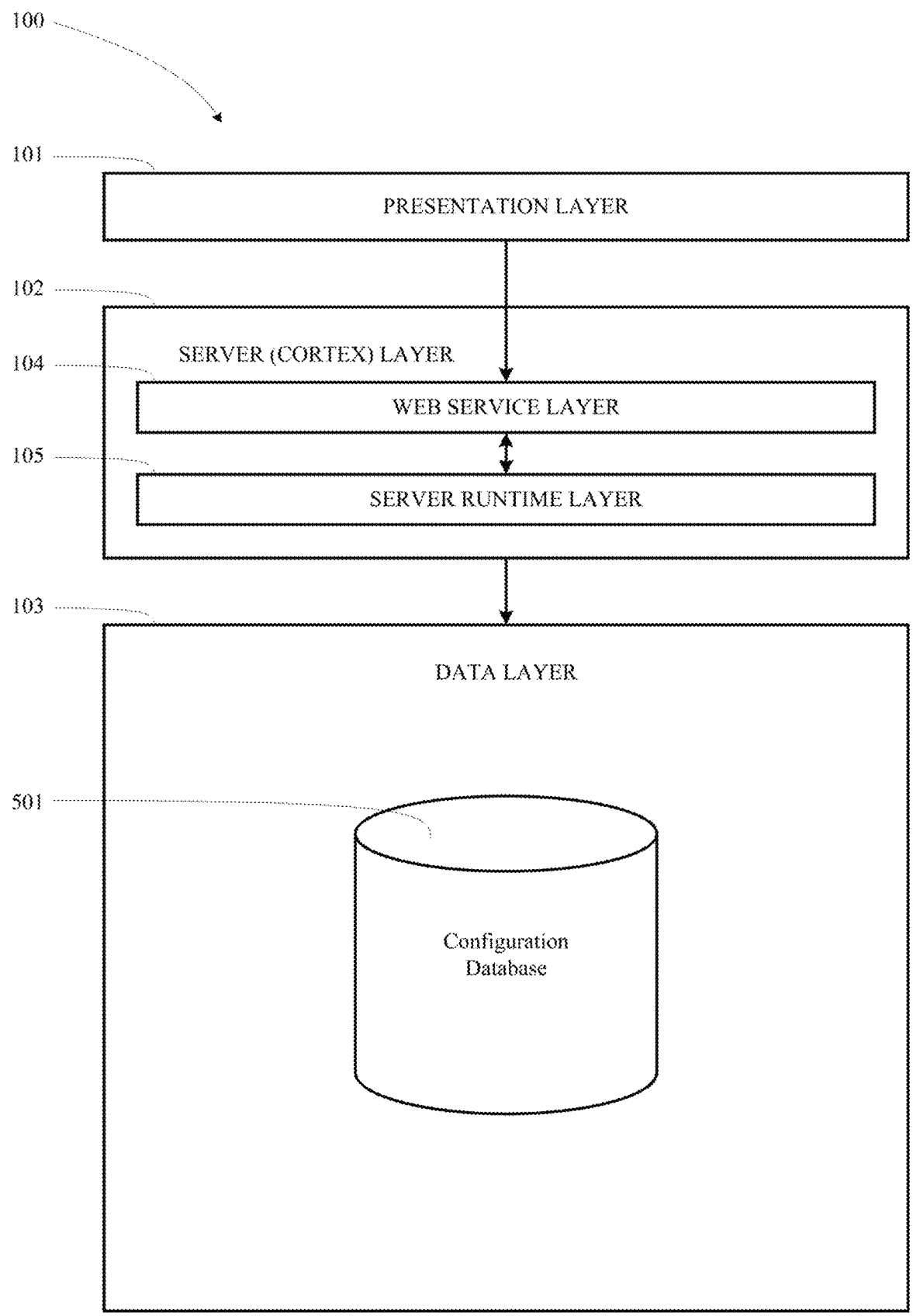
FIG. 5 is a block diagram overview of the system showing the data layer in further detail.

FIG. 5 is a block diagram overview of system 100 showing data layer 103 in further detail. Data layer 103 includes a configuration database 501, which stores configuration data for system 100, such as the parameters of operation for server layer 102, and the configuration properties of each individual neuron instance 402. The configuration database 501 may be implemented using any of a variety of commercially available database management systems, including Oracle, Microsoft SQL, and MySQL systems.

Configuration database 501 contains the full record of all neuron network design information within system 100. For each individual neuron instance 402 in system 100, configuration database 501 contains its unique name, configured properties, and full connection set. Configuration database 501 is therefore the complete description of the total topology of each neuron network within system 100. As each individual neuron instance 402 is selected, configured, and connected with other neuron instances 402 to form neuron networks, configuration database 501 is dynamically updated.

The Neuron

Figure 6:
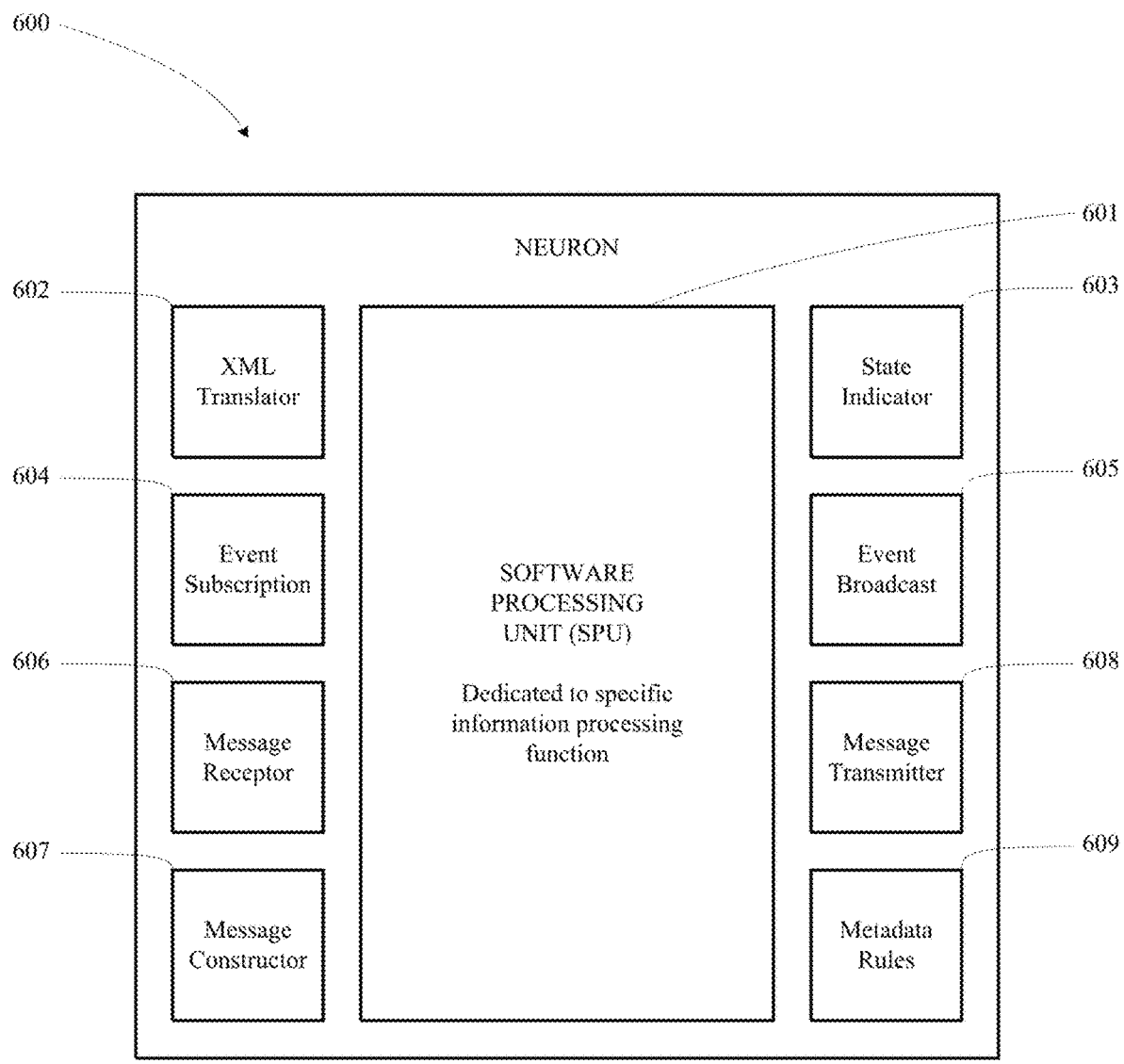
FIG. 6 is a block diagram of a generic neuron.

FIG. 6 is a block diagram of a generic neuron 600. Neuron 600 is a type of software object with the dual purposes of (1) abstracting both specification of complex functionality either natively or in conjunction with connection to existing software systems; and (2) implementing and executing that functionality. Neuron 600 has two key features: (1) neuron 600 acts as a container for, and executes with software processing unit (SPU) 601, a designated information processing function; and (2) neuron 600 is uniformly interoperable with other neurons.

Neurons 600 are generally of specific types, differentiated by the designated information processing function contained. Software processing unit (SPU) 601 is a software virtual equivalent of a processing unit that is highly specialized to efficiently perform a particular information processing function. SPU 601 commonly has a variety of configuration options for its particular information processing function (e.g. algorithms from which a network designer may choose, data sources, etc.). The network designer's selected configuration options for each instance of a neuron 600 are stored as configuration instructions in configuration database 501.

Neuron 600 may receive inputs in the form of a self-describing XML message whose contents contain information for processing by an instantiated neuron's 600 configured SPU 601. XML messages act as triggering events to indicate to execution manager 401 to launch an instance of a neuron 600. When an incoming message arrives at execution manager 401 of a server layer 102 hosting the message's target neuron, execution manager 401 allocates a processing thread to and launches an instance of that target neuron. At this instantiation of a neuron 600, the configuration instructions are retrieved from the neuron configuration service 309, where such instructions are cached after retrieval from configuration database 501 at server startup, and are applied to the SPU 601, dictating the SPU's 601 exact operation. In execution, the instance of the neuron 600 receives these XML messages, processes them through its configured SPU 601, and produces a revised XML message with appropriate transformation, addition or deletion of XML fields.

The structure of the XML message is conceptually straightforward: a message metadata header describing the syntax and semantics of the accompanying data payload, and the data payload of various tagged field names and their respective values. As a message is received by a downstream destination neuron in a network, the message elements are parsed and passed to the receiving logic in the destination neuron. This message-based integration allows very broad flexibility to interconnect highly disparate technologies.

In addition to the core information processing function executed by SPU 601, neuron 600 may perform a number of support functions directed towards uniform interoperability. Neuron 600 may have: an XML translator 602; a state indicator 603; an event subscription service 604; an event broadcast service 605; a message receptor 606; a message constructor 607; a message transmitter 608; and a metadata-based rules matrix 609. The many types of neurons that perform different information processing functions all share this common prototypical construction.

Messages directed to an instance of neuron 600 are received by message receptor 606 and passes them to XML translator 602. Notification messages of internal system events (such as neuron failed processing because source system is unreachable) events broadcast partially or entirely system-wide are received by event subscription service 604. Event subscription service 604 determines if the event is relevant to the instance of the neuron 600, and if relevant, passes the notice message to XML translator 602. XML translator 602 parses the incoming message from message receptor 606 or event subscription service 604, identifying the metadata components of the header and the data payload.

The parsed metadata of the header is passed to metadata-based rules matrix 609. Metadata-based rules matrix 609 examines the parsed header information, applying predetermined rules that impute meaning to the XML tags delimiting the header information and the data payload. XML translator 602 then converts the parsed data payload to the appropriate code (e.g. bytecode, binaries) for processing in SPU 601 based on the meanings determined by metadata-based rules matrix 609. XML translator 602 passes the data payload code to the appropriate inputs of SPU 601. SPU 601 executes its configured information processing function on the parsed data payload.

The results of the primary information processing function are expressed as some combination of state setting, message construction, message transmission, and/or event broadcast. If the results of the configured information processing function generates data to be passed as a payload, the results are passed to message constructor 607. Message constructor 607 assembles the results from SPU 601 into a new outgoing message with appropriate metadata header and data payload. When the new outgoing message is complete, message constructor 607 passes the new outgoing message either to event broadcast service 605, or to message transmitter 608, as determined by SPU 601.

New outgoing messages passed to event broadcast service 605 are delivered to message service 306 for broadcast across part or all of the system. New messages passed to message transmitter 608 are delivered to message service 306 for direction to a subsequent neuron in a network. SPU 601 also may indicate the state of the instance of neuron 600 at any time by recording that state to state indicator 603, which maintains that state until subsequently updated. For example, on failure of processing, SPU 601 may set state indicator 603 to "neuron failed." Such an event also may be broadcast through event broadcast service 605 for retrieval at the server layer 102 for possible follow up action by an error handling system.

Types of Neurons

Each neuron 600 performs a unique information processing function and produces a specific type of output. Neurons may, for convenience, be conceptually grouped into logical categories that represent commonly grouped functions within a neuron network for convenience. These groupings can, for example, be used to categorize neurons in menus for selection when creating a neuron network. The five logical groupings are analytics, cloud services, data interaction, messaging, and output neurons. The information processing functions of analytics neurons are those that provide data processing of one type or another, such as matching algorithms, Boolean logic, predictive modeling, etc. The information processing functions of cloud services neurons provide access to and interaction with scale-out processing infrastructures such as cloud services, as well as manage optimization of their use in conjunction with neuron networks. The information processing functions of data interaction neurons provide uni- or bi-directional data transfer between neuron networks and a wide variety of data sources or applications. The information processing functions of messaging neurons manipulate, augment, append or route messages passed between neurons. The information processing functions of output neurons deliver results to various destination systems. Specific neuron types are described below for convenience. It would be readily apparent for one of ordinary skill in the art to develop additional neurons.

Adapter. A data interactions neuron, the Adapter neuron allows users to cache large data sets for offline operations. By configuring the Adapter neuron to use a database query or a web service, the user can access and cache data sets locally. The cached data sets are available within the cache directory located on the neuron server, and are broken down into the header file and the data file respectively for every single fetch. The cached data sets are easily accessed within a Matching Pro or Analytic neuron by using the call function. The Adapter neuron also can configure the refresh time interval for the data fetch. This feature allows the user to easily control the data access time and fetch interval for caching the data. When solving problems that require large data sets, users may wish to avoid repeatedly querying production data sources. Since database access can be costly and consume significant processing resources, configuring an Adapter neuron to cache during off hours/low usage times reduces the stress on the database. In addition, the Adapter neuron is useful to cache data provided by external web services.

Analytic. An analytics neuron, the Analytic neuron allows network designers to apply existing or imported analytical routines to the contents of incoming messages. The Analytic neuron works across a range of data types, most typically the integer and floating point values used in mathematical analyses. When configuring the neuron, network designers may select from available embedded algorithms, such as the Apache Math Library, to provide routines appropriate for the required analyses. Network designers also may import existing algorithms (e.g. in the form of Java .jar files) or custom build routines using built-in editing tools in design studio 201. A diagram editor for constructing analytic functions is accessible from a configuration dialog box for the Analytic neuron. It includes a sets of constructs such as If/While loops or 'declare a variable', 'set a variable', etc. for selection and configuration by the network designer. As a result, the network designer can map out the processing sequence of the desired analytic function. Configuration of the Analytic neuron to execute the required analyses consists of selecting fields from incoming XML messages and directing those fields to appropriate inputs of the selected algorithm.

Case. An analytics neuron, the Case neuron allows network designers to route messages based on the result of multiple evaluation criteria. Used as a 'case' statement, this neuron is typically used for branching to other neurons based on the evaluation of one or more data elements and conditions within the data set. Messages are routed along multiple branches of a network from a Case neuron depending on the conditions within a given business problem. Complex decision trees are implemented by chaining a series of Case neurons together. Within the configuration of the Case neuron, multiple outgoing branches are made active by providing overlapping case criteria.

Check Transaction. A messaging neuron, the Check Transaction neuron allows network designers to implement sequential dependencies between neurons or networks within a project. Used in conjunction with the Start Transaction neuron, the Check Transaction neuron continuously checks to see if all message activity within the network (or other defined set or subset of neurons) has concluded. Once the message activity has concluded, the Check Transaction neuron outputs a message to any successively connected neurons or networks. The Check Transaction neuron provides sequential processing capability for neurons or networks where strict execution order must be maintained. Such sequential processing is a common requirement in applications where items like summary statistics are only computed after all prerequisite processing has completed. The Check Transaction neuron also is used to help eliminate unknown or random wait times between parallel processing activities in a broader set of networks.

Compare. An analytics neuron, the Compare neuron allows network designers to route messages based on the result of specified evaluation criteria. Used as an 'if/else' statement, this neuron is used for branching to other neurons based on the evaluation of a condition statement that results in a true or false result for each message. Thus, the Compare neuron directs messages and data through different paths within a neuron network based on the evaluation of one or more data elements within the data set. Messages are routed along a "true" or "false" branch of a network from a Compare neuron depending on the conditions within a given business problem. Complex decision trees are implemented by chaining a series of Compare neurons together.

Complete Message. A messaging neuron, the Complete Message neuron allows network designers to mark units of work complete in a multi-node clustering scenario. Clustering is a highly useful construct that offers both parallel processing opportunities for large workloads and a higher degree of resiliency in mission-critical scenarios. The Complete Message neuron is a critical component of the system's 100 clustering infrastructure and ensures that no workload is lost in the event of node failure. These processing nodes of a cluster include one or more neurons and receive dispatched units of work from the Dispatcher neuron. To ensure against loss of active units of work, all dispatched messages are written to a durable message table where they are retained until "retired" by the destination node. In the event of a lost node, unfinished units of work are re-queued from the durable table to a still active node. The Complete Message neuron is placed at the terminating point of each node's neuron chain and signals the Dispatcher neuron to retire the specified unit of work. This functionality may alternatively be implemented within message service 306.

Custom. The Custom neuron can become any of the five logical groupings of neuron types. It allows network designers to create a custom-designed neuron that contains user-specified processing logic and user interface components. The custom neuron is essentially an execution shell that shares the same interoperability as all other neurons, but allows customization of internal behaviors to specific, user defined functionality.

Data Type. A data interaction neuron, the Data Type neuron allows network designers to cast the data type of an incoming XML element to a different data type. Casting allows a user to convert the data type for an extracted data attribute to meet the specific requirements of subsequent neurons in a network. The Data Type neuron enables translation of XML element data types for consistency when receiving and processing messages and their associated fields between neurons. A neuron extracts the elements in their native form from databases, files and third party services. The data is passed to subsequent neurons in the native data type format, which may be inconsistent with various neurons' required fields' data types. If the data types are not consistent when processing, the neurons will not be able to interpret and process the messages, and an exception will occur. By configuring the Data Type neuron to enact the required translation, the relevant fields are re-cast for proper processing. For example, if the extracted data attribute is an integer and the matching algorithm requires a string, the Data Type neuron is inserted into the network between the data extraction and matching network segments to accomplish the required translation of the extracted data from an integer to a string.

Dispatcher. A messaging neuron, the Dispatcher neuron allows network designers to create clusters of defined sets of neuron instances that provide for both parallel processing and/or increased availability of distributed networks. Clustering is a highly useful construct that offer both parallel processing opportunities for large workloads and a higher degree of resiliency in mission-critical scenarios. The Dispatcher neuron is the critical component of the system's 100 clustering infrastructure and ensures sustained performance of work across various processing and environmental scenarios. The Dispatcher neuron employs various dispatching algorithms to vector incoming units of work among two or more worker nodes, i.e., a cluster, in response to conditions including escalation of workload or failure of an active node. Further, the Dispatcher neuron is responsible for re-queuing work in the event of node failure and subsequent cluster re-formation. This functionality may alternatively be implemented within message service 306.

Document. A data interaction neuron, the Document neuron is used to both create an index of a file, set of files in one directory, or set of files across multiple directories and create cached copies of files that have content that matches specified search criteria. Those cached files are then available for processing by subsequent steps in the neuron network where targeted content can be parsed out of the source files for further processing.

File. A data interaction neuron, the File neuron is used to access files and retrieve specific contents for further processing within a neuron network. Significant content may be stored outside of relational databases, in files available on the network or file servers (for example, CSV files, or other structured or semi-structured file types). During the design process, network designers configure the parsing behavior of the File neuron to extract specific content of value for use by downstream processing neurons.

Filter. A data interaction neuron, the Filter neuron allows network designers to eliminate specified fields from an incoming XML message before that message is propagated through the network. Use is desirable in cases where sensitive information is required for processing in one portion of a network, but should be eliminated from visibility in other parts of the network or prevented from propagating to other hosts. Data privacy laws also may require such use. Additionally, the Filter neuron provides a convenient mechanism to reduce XML message size when fields are no longer needed, potentially improving both processing times and network bandwidth demands during execution.

FTP. A data interaction and output neuron, the FTP neuron sends files to or receives files from a remote server using the File Transfer Protocol.

HTTP. A data interaction neuron, the HTTP neuron retrieves from or posts information to a specified uniform resource locator (URL) using HyperText Transfer Protocol.

HTTP Send. A data interaction neuron, the HTTP Send neuron serves as proxy to send created XML messages to a specified URL for further processing.

HUD. An output and data interaction neuron, the HUD (Heads Up Display) neuron allows network designers to include direct end user interaction with a running neuron network in the form of a configurable application that appears to the end user within its own window. With this capability, information is extracted from a running network and displayed in various forms to the user. Alternatively the network receives information from an end user who then interacts with buttons, dialog boxes, etc. of the displayed window. The HUD neuron is used also to present recommendations developed within a processing network for ultimate agreement or disagreement by a user.

JMS Listener. A messaging neuron, the JMS Listener neuron retrieves messages from a specified JMS topic to provide a point of entry into a neuron network from a JMS messaging system. By specifying the appropriate JMS connection, the neuron network is able to retrieve messages from enterprise-class messaging infrastructures.

JMS Publisher. A messaging neuron, the JMS Publisher neuron posts information in the form of JMS messages on a specified JMS topic to provide an outbound path for messages destined for other resources in the broader environment. By specifying the appropriate JMS connection, the neuron network is able to send messages through enterprise-class messaging infrastructures.

Mail. An output neuron, the Mail neuron sends messages to remote users using the Simple Mail Transport Protocol (SMTP). A Mail neuron can be configured in any portion of a network. For example, a Mail neuron is configured to send an e-mail alert to a user when the error branch of Compare neuron is triggered. In another example, a Mail neuron sends an email of the results of a network, e.g. a bank account low balance alert.

Matching Pro. An analytics neuron, the Matching Pro neuron allows network designers to match records or fields from multiple record sets using a variety of matching algorithms. The Matching Pro neuron effects a two-step process of data scrubbing and matching between data sets. Alternatively, the data scrubbing and matching functions occur separately as the information processing functions of a data scrubbing neuron and a matching neuron, respectively. Network designers can configure scrubbing algorithms to remove special characters, title abbreviations (Mr., Ms., Jr., etc.), or other abbreviations contained within the data elements of all data sets. A diagram editor for constructing composite matching processes is accessible from a configuration dialog box for the Matching Pro neuron. It includes a sets of constructs such as If/While loops or 'declare a variable', 'set a variable', etc. for selection and configuration by the network designer. The network designer thereby maps out the processing sequence of the desired matching function. The network designer also selects one or more of the matching algorithms and weighting sequences available within the Matching Pro neuron matching library to apply within that processing sequence the match elements between the data sets, and generate a message indicating a match if a match confidence threshold is met.

The network designer user may choose to apply any one or more data scrubbing or matching processes to the provided match record sets at runtime, including: name & address cleanse, unique identifier match, perfect name match, alias matching, Jaro-Winkler distance algorithm, Phonetic match, deterministic matching, probabilistic matching, or other custom matching rules. In the design studio, the Matching Pro neuron is associated with a graphical diagram editor (accessible through the icon for that neuron instance) with various configurable primitives to construct analytical routines, including the ability to retrieve data, create new variables, perform analytical routines, and store results in said new variables.

New Message. A data interaction neuron, the New Message neuron allows network designers to create a new XML message with user tags defined within the configuration properties of the New Message neuron instance. The New Message neuron thus allows network designers to create new messages or manipulate existing messages to, for example, remove tags and data elements which might be of a sensitive nature. The sensitive data can be used within a network for calculations or other models and logic, and then removed so that only results-oriented data is passed through the network.

Persist. A data interaction neuron, the Persist neuron allows network designers to store XML messages passed through it into the configuration database 501. This enables storage of messages that may be needed at a later time for audit or other purposes.

Predictive. An analytics neuron, The Predictive neuron allows network designers to incorporate and apply predictive analytics models (such as logistic regression) in the neuron network by converting a Predictive Model Markup Language (PMML)—compliant predictive model into a runtime executable. At design time, the predictive model is imported and associated with the Predictive neuron instance in configuration database 501. Also at design time, the Predictive neuron decomposes predictive model and creates an executable representation of the model logic (e.g. a Java .jar file), which then executes as the statistics engine SPU 601 of the Predictive neuron at run time.

Print. An output neuron, the Print neuron allows network designers to direct the full contents of an XML message to the system console for viewing and/or printing. The Print neuron requires no configuration, and is added at any point in a network to gain visibility to the contents of messaging passing that point in the design.

Query. A data interaction neuron, the Query neuron allows network designers to execute a SQL database query against a defined data source. By configuring specific queries, a network designer is able to target and retrieve only the specific data required for the target solution. Within the configuration properties of the Query neuron, a database source property indicates the specific connection alias that is used to properly target the desired source database. This alias is a pre-configured, credentialed connection to a specific database set up by a privileged user. The database connection pool 406 within runtime layer 105 establishes, in the database query case, an API data access connection (such as a JDBC connection) to the target source database which is the conduit for the passing of the configured SQL query logic and returned results set.

Within the configuration properties of the Query neuron, a query statement property indicates the specific SQL query that will be executed against the target source database. Queries may be simple or complex, involving joins, database functions, or advanced conditions. At design time, the network designer has the option of importing an existing SQL statement directly into the Query statement property or using the embedded visual query building tool, where designers can visualize the tables and fields accessible for the given alias and through point-and-click operations visually construct the intended SQL query.

Record. A data interaction and output neuron, the Record neuron stores elements from XML messages in the configuration database 501 or other database. The Record neuron provides network designers with the ability to store XML message contents at any point in their network design, to serve, e.g., audit or solution debug purposes. The Record neuron stores selected contents of XML messages in a database for subsequent review in history and history values tables. The history table is updated with one row for each XML message received. The data stored in the history table includes the message id, timestamp and name of the Record neuron. The data elements from each XML message are written to the history values table. There is one entry for each data element.

Remove Persistent. A data interaction neuron, the Remove Persist neuron allows network designers to remove messages originally stored by the Persist neuron from the message history tables when the stored message content is no longer needed (e.g., after debug or audit has concluded).

Rules. An analytics neuron, the Rules neuron allows network designers to apply business logic rules to the contents of incoming messages. The Rules neuron incorporates a business logic development & integration engine, such as the Drools runtime rules engine, for performing deduction, rewriting, and further inferential-transformational tasks. When configuring the neuron in design studio 201, network designers import a RulesML compatible model which is decomposed and re-constituted as one or more JAVA .jar files, available for execution by the specific Rules neuron instance at run time.

SAS. An analytics neuron, the SAS neuron allows network designers to import existing SAS (Statistical Analysis System) PMML models for analysis. During the import process, the SAS model is converted into a runtime executable which is stored within a dedicated neuron type. This allows the SAS model to be applied without the dependency of an underlying SAS database. Rather, units of work (payload of an XML message, cache files, etc.) serve as inputs to the SAS neuron which perform the requisite computations. The SAS neuron can be used in any part of a network and additionally replicated where needed to facilitate parallel processing.

Save. A data interaction neuron, the Save neuron stores the complete XML message received to a local directory. The Save neuron can be used multiple times and in any location within a network. The Save neuron provides a simple and convenient way to export individual messages outside the neuron environment.

Schedule. A data interaction neuron, the Schedule neuron allows network designers to configure start times, time intervals and recurrent events for executing neurons or a neuron network (such as starting a neuron on the $3^{rd}$ of each month at 9:00 pm).

Sequence. A messaging neuron, the Sequence neuron allows network designers to set and increment a message counter within a neuron network. The Sequence neuron counts messages passed to it and passes the message count along in the message payload to other neurons.

Service. A data interaction and output neuron, the Service neuron allows network designers to initiate web service requests and receive web service responses from applications using Simple Object Access Protocol (SOAP) and HTML. The Service neuron retrieves information from web services and adds the information to the neuron network's XML messages for additional processing. In one example, a Service neuron interacts with a web service, such as SalesForce.com, SAP or Oracle to retrieve customer information. In another example, the Service neuron retrieves the current stock price for a specific stock symbol. Web services use XML to code and decode data, and SOAP to transport the data. SOAP is an XML-based protocol that allows applications to exchange information over HTTP. Web Service Description Language (WSDL) describes a web service and advertises the functions it supports. The Service neuron interrogates the WSDL file to display the methods supported by the web service.

Sniffer. A data interaction neuron, the Sniffer neuron allows network designers to monitor specific ports for HTTP activity and bring the HTTP request into the system 100 environment. The Sniffer neuron thus enables system 100 to respond to HTTP requests with specifically configured actions that key off the content of the HTTP request. An example is to monitor for an end user-initiated action to open a customer service record. A Sniffer neuron detecting the act of opening that customer record could then automatically launch a distributed analytics solution neuron network to gather data specific to that customer, perform integrative analysis and provide it to the end user, rather than requiring the end user to manually gather that secondary information.

Start Transaction. A messaging neuron, the Start Transaction neuron allows network designers to implement sequential dependencies between neurons or neuron networks. Used in conjunction with the Check Transaction neuron, Start Transaction initiates internal message tracking that tags all active messages as elements of a sequential neuron network. As new messages are created, they are tagged with an ID associated with the Start Transaction neuron. As these messages progress through a neuron network, existing messages are destroyed and new ones created. The Start Transaction neuron provides sequential processing capability for neurons or networks where strict execution order must be maintained. Such sequential processing is a common requirement in applications where items such as summary statistics can only be computed after all prerequisite processing has completed. Through the same message tracing mechanisms, the Start Transaction neuron also can be used to help account for unknown or random wait times between parallel processing activities in a broader set of networks by providing the ability to track the execution of concurrent logic paths, and in conjunction with the Check Transaction neuron, signal completion only when the last of possibly several execution paths has completed processing.

Stored Procedure. A data interaction neuron, the Stored Procedure neuron allows network designers to run a stored procedure in a database, where a data source definition for that database has been created in the system 100. Database administrators and programmers often create stored procedures to maximize database efficiency or ensure accuracy and consistency of configured queries. These procedures may be configured for particular functions, calculations or results. Typical uses for stored procedures include data validation (integrated into the database) or access control mechanisms. Stored procedures also can consolidate and centralize logic that was originally implemented in applications. Extensive or complex processing that requires execution of several SQL statements is often moved into stored procedures, and applications call the procedures.

Update. A data interaction and output neuron, the Update neuron allows network designers to execute a SQL database statement to insert new records, update existing records or delete records within a defined data source. Running a neuron network that processes data, executes analytics or otherwise produces results and intelligence creates information that can be maintained in a database. The Update neuron inserts these results (or deletes or updates them) into any database where a database source definition has been created in system 100 and where the user has privileges to create or update records.

Variable Cache. A data interaction neuron, the Variable Cache neuron allows network designers to retrieve user-defined variables from a specified storage location, and place them in a cache location in local memory for direct use throughout a neuron network. These variables represent weights in a calculation that is repeated numerous times or numerous other values useful in broader networks. Further, the values and value ranges of those variables can be exposed within the enterprise control manager 202, providing a dynamic editing ability for the values of those variables. Thus, the Variable Cache neuron 703 enables network designers to create a set of shared "global variables" for use across all neurons as an efficient way to share key parameters across a network without requiring additional data transmission in the message structure Variable. A data interaction neuron, The Variable neuron allows network designers to create a new data element with an initial value or edit an existing element to a new value in an XML message. This element is used in subsequent calculations or events within a neuron network, for the purpose of storing calculations or results, or for creating temporary data used for analytics. The Variable neuron also can be used in conjunction with the Compare neuron to conditionally identify different XML messages. For example, if a message goes through the "True" branch of the Compare neuron instance, a Variable neuron instance can be configured to tag that message accordingly. A second Variable neuron instance could similarly be placed on the "Else" branch to identify messages going down that branch.

Wrapper. A cloud services neuron, the Wrapper neuron allows network designers to encapsulate existing applications or Java libraries containing classes and methods into a neuron for use within a network. By encapsulating Java programs in this manner, system 100 allows the user to execute that function or program in multiple parallel streams, and distribute the program functions across the client infrastructure. Applications with limited performance when encapsulated in this manner can scale horizontally to take advantage of clustering and demand resiliency models offered by system 100. For example, an existing application that is running synchronously and has performance throughput bottlenecks may be encapsulated by a Wrapper neuron. By encapsulating the application, the processing time is significantly reduced by replicating that wrapped application and deploying those multiple instance to various physical or virtual machines.

Additional particular information processing functions encapsulated with neuron-type characteristics and functionality are also neurons.

Neuron Networks

Figure 7:
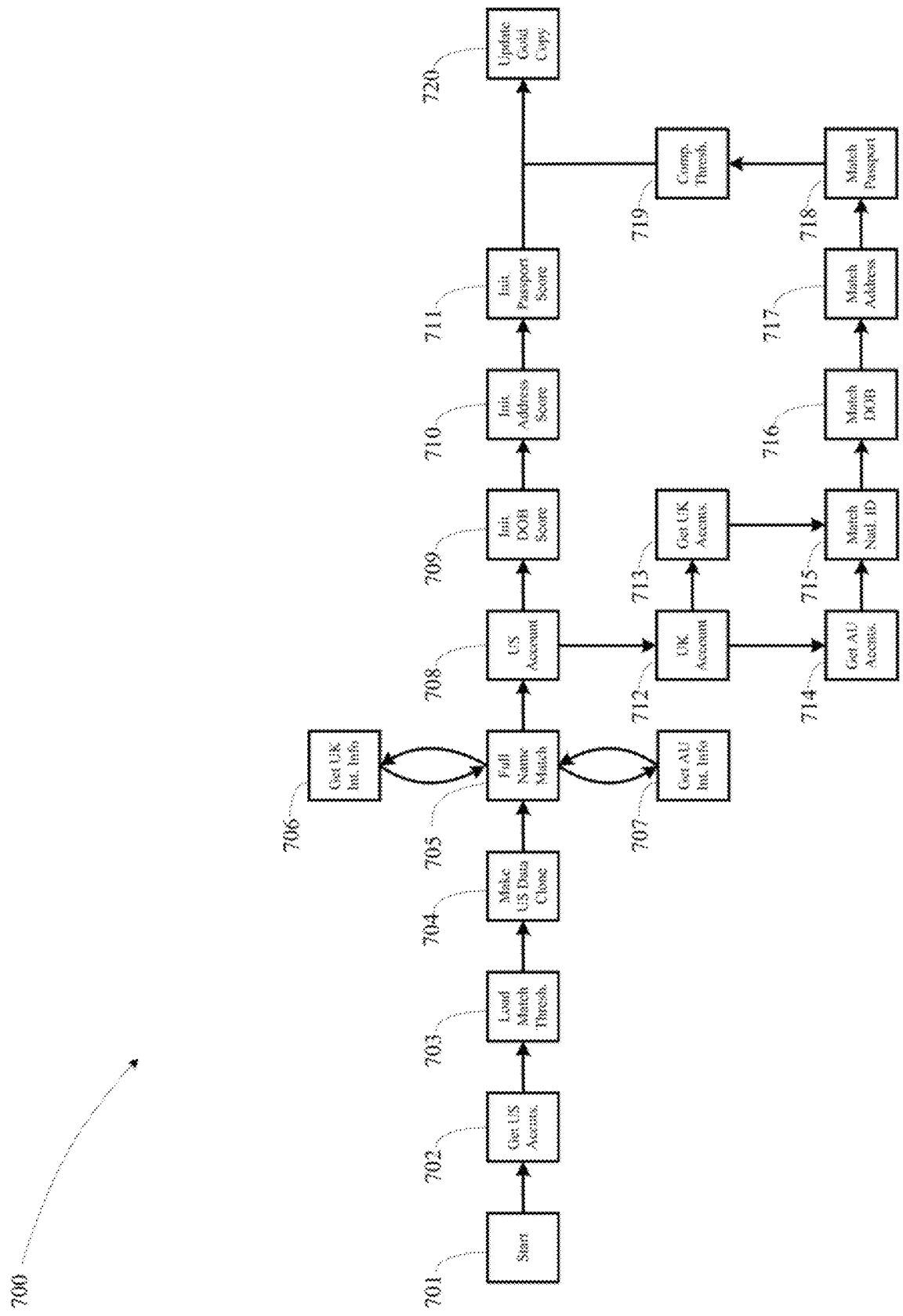
FIG. 7 is a network diagram showing an exemplary neuron network.

FIG. 7 is a network diagram showing an exemplary neuron network 700. Instances of a neuron hosted within server layer 102 can act alone as independent functions or services, be overlaid on top of existing applications or data, or can be connected via XML messages in real time to other neuron instances, as seen with neuron instances 701-720, to form a network 700, all as directed by the network designer in the design studio 201. Network 700 of intercommunicating neuron instances 701-720, is configured and linked together such that the aggregate discrete information processing functions of the neuron instances 701-720 create a more complex business solution, i.e., a report, an application, a workflow, an entire operating model. Such networks readily combine synchronous and/or asynchronous functions, schedules and events.

In the example network 700, the network operates to generate a global "golden copy" of customer account data for an enterprise with operations in the US, the UK, and Australia. The various neuron instances 701-720 are interconnected in order to identify required data at distributed sources and databases; to run name derivations, fuzzy name, deterministic or probabilistic matching and other reconciliation functions to allow data consistency and cleanup, and identify U.S. citizenship status; and to measure customer activities globally and convert to standard U.S. dollar notional value. The example network 700 represents a subset of a complete IRS FATCA solution. The example network 700 shown is approximately the first half of the solution (excluding the retrieval of underlying customer data from disparate US, UK, and AU locations), performing matching activities to yield a single customer master database and the action of maintaining into an external database for subsequent neuron and/or external system analysis. Further analyses may include use of predictive modeling against the results to identify flight risk, peer profile metrics, or propensity analysis. Each of these further analyses may be accomplished with the construction of an additional neuron network. The outputs of any of these analyses may be provided to reports or other applications, IRS reporting templates, or other neuron instances or neuron networks.

Instance of trigger neuron "Start" 701, when activated manually by a user, passes a message to the next downstream neuron instance, configured instance of query neuron "Get US Accounts" 702, triggering its operation. Instance of trigger neuron "Start" 701 could be replaced with an instance of a Schedule neuron configured to initiate the network 700 on a given schedule.

"Get US Accounts" 702 is configured to execute a query against a database that retrieves a listing of US accounts, and include the retrieved information in the data payload of a new message. "Get US Accounts" 702 passes its new message to the next downstream neuron instance, configured instance of Variable Cache neuron "Load Matching Thresholds" 703, triggering its operation.

"Load Matching Thresholds" 703 is configured to retrieve matching threshold values previously selected by the network designer from their storage location, and place them in a cache location in local memory for direct use by all other neurons in this network 700. After thus retrieving and caching the threshold variables, "Load Matching Thresholds" 703 then creates a new message with the data payload of the message from "Get US Accounts" 702, creating an outgoing message essentially the same as that it received from "Get US Accounts" 702. "Load Matching Thresholds" 703 passes its new message to the next downstream neuron instance, configured instance of Matching Pro neuron "Make US Data Clone" 704, triggering its operation.

"Make US Data Clone" 704 is configured to perform a data cleanup on the retrieved US account records in the incoming message's data payload. "Make US Data Clone" 704 retrieves the matching thresholds from the incoming message's data payload, and matches elements from the US account records, linking the records when the matching thresholds are met. The resulting links between US account records are added in new fields to the data payload of the message from "Load Matching Thresholds" 703. "Make US Data Clone" 704 creates a new message with the combined data payload, and passes it to the next downstream neuron instance, configured instance of Matching Pro neuron "Full Name Matching" 705, triggering its operation.

"Full Name Matching" 705 is configured to evaluate whether the linked US account records in the data payload of the message received from "Make US Data Clone" 704 matches any record from the two other geographies, UK and Australia. "Full Name Matching" 705 executes a call function composing and passing messages to both "Get UK Intermediate Info" 706 and "Get AU Intermediate Info" 707, each configured instances of Adapter neurons, and triggering their operation.

"Get UK Intermediate Info" 706 and "Get AU Intermediate Info" 707 are configured to retrieve (through appropriate aliases) the account record set from targeted UK source database, and a targeted Australian database, respectively, and cache them within local memory. "Get UK Info" 706 is identical to "Get Australia Int. Info" 707 with the exception that different source systems, one holding UK account information, and the other holding Australian account information, are the targeted source system. Depending on the targeted source system, the structure of the query statement property may differ between the two neuron instances. The account record sets are being retrieved and cached by these instances 706, 707 to accelerate data access during the record matching processes to be executed by "Full Name Match" 705. When either neuron instance 706, 707 successfully caches its retrieved records set, that neuron creates a new message with a pointer to its cached records set, and passes it back to configured instance of Matching Pro neuron "Full Name Matching" 705, already in operation.

When both "Get UK Intermediate Info" 706 and "Get AU Intermediate Info" have returned pointers to the cached UK and Australian records sets, "Full Name Matching" 705 commences analytical and matching logic sequence. Thus, "Full Name Matching" 705 passes a message on to "US Account" 708 of every individual US record, and of each individual UK or Australian record found to be a match to a US account. The match threshold variables loaded in "Load Match Threshold" 703 and applied here by "Full Name Matching" 705 may be set low, allowing low confidence matches to pass through the Network 700 for further evaluation. For each US record: (1) "Full Name Matching" 705 compares the full name data of the US record with the full name data for each record of the UK records set, and where a UK record is determined to be a match to the US record, "Full Name Matching" 705 creates a new message with the complete individual UK record and US record and passes it to configured instance of Case neuron "US Account" 708, triggering its operation; (2) "Full Name Matching" 705 compares the full name data of the US record with the full name data for each record of the Australian records set, and where an Australian record is determined to be a match to the US record, "Full Name Matching" 705 creates a new message with the complete individual Australian record and US record and passes it to configured instance of Case neuron "US Account" 708, triggering its operation; and (3) "Full Name Matching" 705 creates a new message with the complete individual US record and passes it to the next downstream neuron instance, configured instance of Case neuron "US Account" 708, triggering its operation.

"US Account" 708 provides a routing function to control the flow of processing within the Network 700. "US Account" 708 examines the record passed to it by "Full Name Matching" 705 to determine if it is a US account, based on the setting of one or more key values in the record. (Note that the UK or Australian records may be UK or Australian records for a US account). "US Account" 708 creates a new message with the individual record of the message from "Full Name Matching" 705, creating an outgoing message essentially the same as that it received from "Full Name Matching" 705. In the "True" case (that the record is a US account), "US Account" 708 passes its new message to the first neuron instance, of the top execution path, configured instance of Variable neuron "Initialize DOB Score" 709, triggering its operation. In the "False" case (that the record is NOT a US account), "US Account" 708 passes its new message to the first neuron instance, of the lower execution path, configured instance of Case neuron "UK Account" 712, triggering its operation.

"Initialize DOB Score" 709 is configured to create a new message adding in a new field a confidence score value for the Date of Birth of the individual US record passed to it by "US Account" 708. This variable is a placeholder for a score applicable to foreign accounts, as appended to foreign account records by "Match Date of Birth" 716. "Initialize DOB Score" 709 passes its new message to the next downstream neuron instance, configured instance of Variable neuron "Initialize Address Score" 710, triggering its operation.

"Initialize Address Score" 710 is configured to create a new message adding in a new field a confidence score value for the Address of the individual US record passed to it by "Initialize DOB Score" 709. This variable is a placeholder for a score applicable to foreign accounts, as appended to foreign account records by "Match Address" 717. "Initialize Address Score" 710 passes its new message to the next downstream neuron instance, configured instance of variable neuron "Initialize Passport Score" 711, triggering its operation.

"Initialize Passport Score" 711 is configured to create a new message adding in a new field a confidence score value for the passport information of the individual US record passed to it by "Initialize Address Score" 710. This variable is a placeholder for a score applicable to foreign accounts, as appended to foreign account records by "Match Passport"

718. "Initialize Passport Score" 711 passes its new message to the next downstream neuron instance, configured instance of Update neuron "Update Gold Copy" 720, triggering its operation.

"UK Account" 712 provides a further routing function to control the flow of processing within the Network 700. "UK Account" 712 examines the record passed to it by "US Account" 708 to determine if it is a UK account, based on the setting of one or more key values in the record. "UK Accounts" 712 creates a new message with the individual record of the message from "US Account" 708, creating an outgoing message essentially the same as that it received from "US Account" 708. In the "True" case (that the record is a UK account), "UK Account" 712 passes its new message to configured instance of Query neuron "Get UK Accounts" 713, triggering its operation. In the "False" case (that the record is NOT a US account, and by process of elimination, is therefore an Australian account), "UK Account" 712 passes its new message to configured instance of Query neuron "Get AU Accounts" 714, triggering its operation.

"Get UK Accounts" 713 is configured to execute a query against a database that retrieves (through an appropriate alias) from targeted UK source database all UK account data associated with the record passed to it by "UK Account," based on the setting of one or more key values in the record. "Get UK Accounts" 713 includes the retrieved information in the data payload of a new message along with the US record, and passes its new message to the next downstream neuron instance, configured instance of Matching Pro neuron "Match National ID" 715, triggering its operation.

"Get AU Accounts" 714 is configured to execute a query against a database that retrieves (through an appropriate alias) from targeted Australian source database all Australian account data associated with the record passed to it by "UK Account," based on the setting of one or more key values in the record. "Get AU Accounts" 714 includes the retrieved information in the data payload of a new message along with the US record, and passes its new message to the next downstream neuron instance, configured instance of Matching Pro neuron "Match National ID" 715, triggering its operation.

"Match National ID" 715 evaluates how well the national identifier (e.g. Social Security number) of any of the UK or Australian account records in the data payload of the message received from "Get UK Accounts" 713 or "Get AU Accounts" 714, respectively, matches the national identifier of the US record. "Match National ID" 715 compares the national identifier of the US record to the national identifier of each individual record of the received UK or Australian records, generating a national ID match score for each individual received record. "Match National ID" 715 creates a new message with the complete received records and US record, and appends the associated national ID match score to each individual received record in a new field. "Match National ID" 715 and passes the new message to configured instance of Matching Pro neuron "Match Date of Birth" 716, triggering its operation.

"Match Date of Birth" 716 evaluates how well the date of birth of any of the UK or Australian account records in the data payload of the message received from "Match National ID" 715 matches the date of birth of the US record. "Match Date of Birth" 716 compares the date of birth of the US record to the date of birth of each individual record of the received UK or Australian records, generating a date of birth match score for each individual received record. "Match Date of Birth" 716 creates a new message with the complete received records and US record, and appends the associated date of birth match score to each individual received record in a new field. "Match Date of Birth" 716 passes the new message to configured instance of Matching Pro neuron "Match Address" 717, triggering its operation.

"Match Address" 717 evaluates how well the address of any of the UK or Australian account records in the data payload of the message received from "Match Date of Birth" 716, matches the address of the US record. "Match Address" 717 compares the address of the US record to the address of each individual record of the received UK or Australian records, generating an address match score for each individual received record. "Match Address" 717 creates a new message with the complete received records and US record, and appends the associated address match score to each individual received record in a new field. "Match Address" 717 passes the new message to configured instance of Matching Pro neuron "Match Passport" 718, triggering its operation.

"Match Passport" 718 evaluates how well the passport of any of the UK or Australian account records in the data payload of the message received from "Match Address" 717, matches the address of the US record. "Match Passport" 718 compares the passport information of the US record to the passport information of each individual record of the received UK or Australian records, generating a passport match score for each individual received record. "Match Passport" 718 creates a new message with the complete received records and US record, and appends the associated passport match score to each individual received record in a new field. "Match Address" 718 passes the new message to configured instance of Matching Pro neuron "Compare Thresholds" 719, triggering its operation.

"Compare Thresholds" 719 determines whether the National ID, Date of Birth, Address, and Passport match scores of each UK or Australian account records in the data payload of the message received from "Match Passport" 718, are sufficient, in comparison with the match threshold values loaded to cache in local memory by "Load Match Thresholds" 703 to justify including it in the network output gold copy database. "Compare Thresholds" 719 compares each of the National ID, Date of Birth, Address, and Passport match scores of each UK or Australian account record to the appropriate threshold value cached in local memory. If, for an individual UK or Australian record, each match score meets or exceeds the respective threshold variable for each match score, "Compare Thresholds" 719 creates a new message with that individual UK or Australian record, and passes the message to configured instance of Update neuron "Update Gold Copy" 720, triggering its operation.

"Update Gold Copy" 720 operates to insert each record it receives from either "Initialize Passport Score" 711 or "Compare Thresholds" 719 as a new record in a database. No further processing is required in the neuron network, so "Update Gold Copy" 720 need not pass messages to subsequent neurons, although it may be configured to pass its input messages on to other neurons, if desired.

Integrated Develop, Deploy, and Run

Figure 8A:
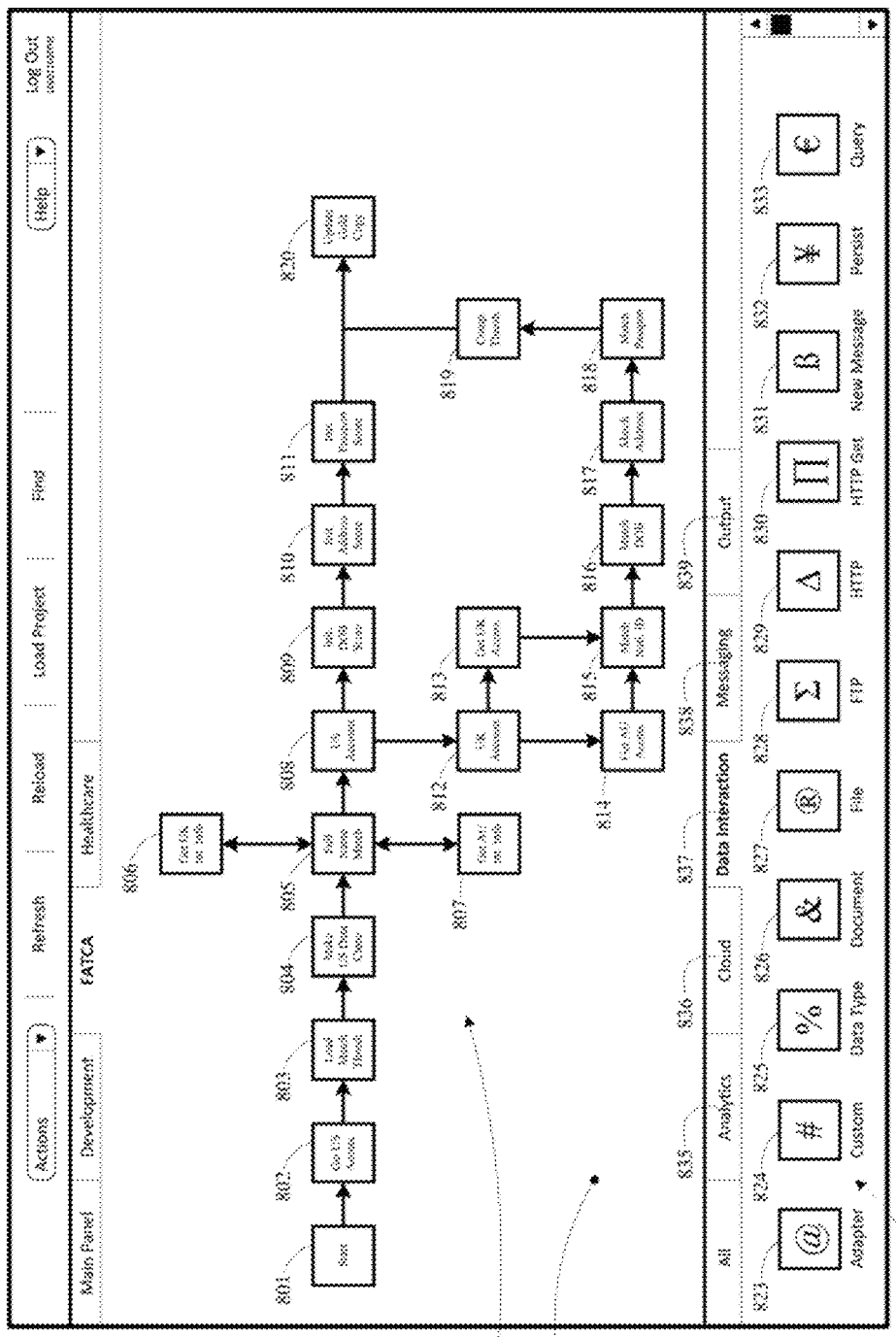
FIG. 8A shows an example graphical user interface of a design studio.

FIG. 8A shows an example graphical user interface 800 of design studio 201. The graphical user interface 800 allows network designers to configure instances of neurons and arrange them in networks, establish sources and targets within an environment (data sources, directories, web sites, etc.), set network level properties, and set various permissions for access and usage. Icons 801-820 of neurons are placed onto the working area or "canvas" 821 in the graphical user interface 800 to represent individual neuron instances. Within canvas 821, the network designer constructs and configures neuron networks. Existing example neuron network 700 is represented by the icon network 822 displayed within canvas 821, and is ready to be edited or expanded. New neuron instances to be added to the network 700 are selected from neuron type tiles 823-833 in a palette 834 of available neuron types and dragged, placed, or "dropped" onto the canvas 821. The palette 834 may be broken by tabs, horizontal/vertical rules, or the like, into categories 835-839, which as a practical matter often correspond to the broad categories previously described (i.e. type of information processing function). Each time a selected neuron type is "dropped," a new instance of that selected neuron type is created in configuration database 501 and represented by an icon, e.g., "Load Match Threshold" neuron icon 803, on canvas 821. Each neuron instance may be configured (to determine its behaviors), and connected (to other neuron instances) to indicate destinations for the neuron instance's outputs, by manipulating its associated icon, e.g., "Load Match Threshold" neuron icon 803, placed on the canvas 821 in the graphical user interface 800.

Figure 8B:
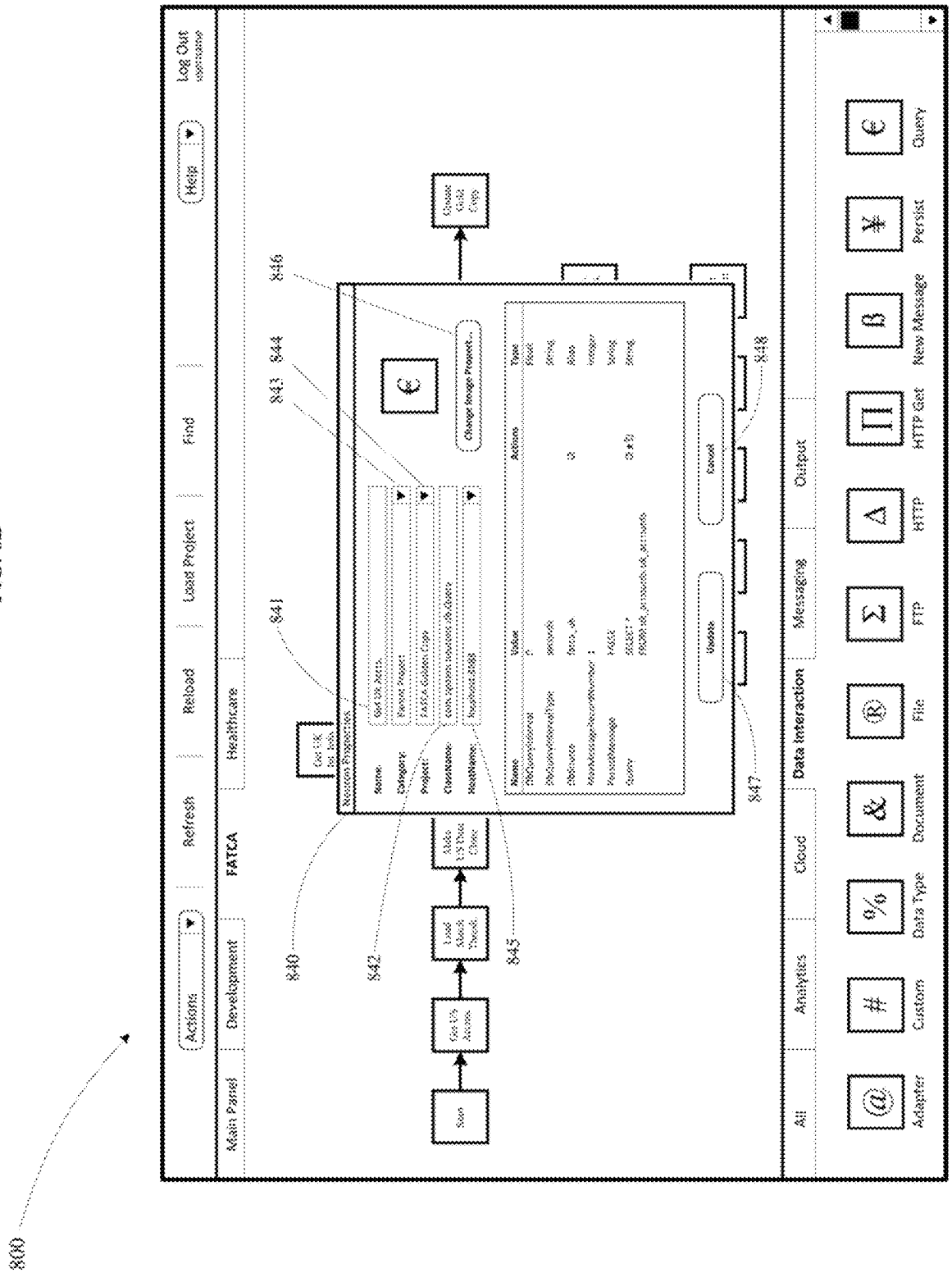
FIG. 8B shows an example configuration dialog box available to the network designer in a design studio.

Access to modify the configuration properties of any instance of a neuron may be obtained both at time of placement of its icon, e.g., "Get UK Accounts" neuron icon 813, or by interaction with its icon, e.g., "Get UK Accounts" neuron icon 813. Referring now to FIG. 8B, for example, a configuration dialog box 840 is available to the network designer after right-clicking on a selected icon, e.g., "Get UK Accounts" neuron icon 813. Most neuron types have distinctly configurable properties, and the properties dialog may have few or many individual properties to be configured. Depending on the type of property, configuration of the neuron property may be achieved by entering a distinct value into a text box, such as with Name property 841 and ClassName property 842, visually pointing and clicking from a drop-down list as with Category property 843, Project property 844, and HostName property 845, loading from a source file as in Image property 846, or dragging and dropping sub-components that are individually configured (not shown). Many of these properties are general properties common to all neuron types. Additional properties (such as those shown in the table) at the bottom of the configuration dialog box 840 may be more specific to the particular neuron type, although they may be similarly configurable. Any modification of the configuration properties of an instance of a neuron via its icon, e.g., "Get UK Accounts" neuron icon 813, is immediately promulgated to the configuration database 501 when the network designer selects Update button 847. Alternatively, selecting cancel button 848 does not promulgate the entered field values to the configuration database 501, leaving the configuration of the neuron instance unchanged.

The set of configurable properties for each type of neuron is a distinct and pre-established set, and the configuration process is limited to those specific items. In addition, many neurons types are highly customizable, and the tools presented to the network designer through the configuration dialog box are sophisticated. However, just as in simpler cases, relevant variables for each of these matching algorithms and weighting sequences may be defined or manipulated in configuration dialog box 840. All configuration of the instance of the matching instance is stored in the configuration database 510 when Update button 847 is selected.

When a Matching Pro neuron instance is accessed by the network designer through the associated icon on canvas 821, the matching algorithms and weighting sequences are presented to the network designer for modification or selection of an appropriate algorithm or weighting sequence through configuration dialog box 840. Additionally, custom or third party matching algorithms or weighting sequences may be imported from external sources such as a file or database location and selected for application.

When an Analytics neuron instance is accessed by the network designer through the associated icon on canvas 821, the network designer is presented with access through configuration dialog box 840 to an analytical model configuration tool (not shown) within graphical user interface 800. Using the analytical model configuration tool, the network designer constructs custom analytical models from standardized math and logic components stored within the analytics neuron, such as those available from Apache Math Library. The network designer is also presented with the option to import algorithms published in compatible form (e.g. a Java .jar file) from third party analytic tools (e.g. SAS, TIBCO Spotfire, MatLab, Cognos, or other analysis products) from external sources such as a file or database location to the analytics neuron instance using configuration dialog box 840. If desired, analytical functions may be developed in standalone tools and similarly imported.

When a Rules neuron instance is accessed by the network designer through the associated icon on canvas 821, the network designer is presented with access through configuration dialog box 840 to a rules configuration tool, (not shown) within graphical user interface 800. Using the rules configuration tool, the network designer imports their own rules in a rules language (such as RulesML) compatible with the business logic execution engine of the Rules neuron. If desired, rules may be configured in a separate rules tool, and either imported during configuration through configuration dialog box 840 and stored to configuration database 501, or accessed by the Rules neuron instance from the separate rules tool at runtime. All of the rules, whether stored within the configuration database 501, or accessed from the separate rules tool at runtime, or provided in another manner, are presented to the execution engine by a rule-language specific interface included as part of the Rules neuron's information processing function.

When a Predictive neuron instance is accessed by the network designer through the associated icon on canvas 821, configuration dialog box 840 presents the network designer with the options to import Predictive Model Markup Language (PMML) standard files. The PMML standard predictive model files are configured in a third party modeling tool, and either imported during configuration through configuration dialog box 840 and stored to configuration database 501, or accessed by the predictive neuron instance from the separate modeling tool at runtime. All the models, whether stored within the configuration database 501, or accessed from the separate modeling tool at runtime, or provided in another manner, are presented to the runtime statistics engine by a PMML-specific interface included as part of the rules neuron's information processing function.

Figure 8C:
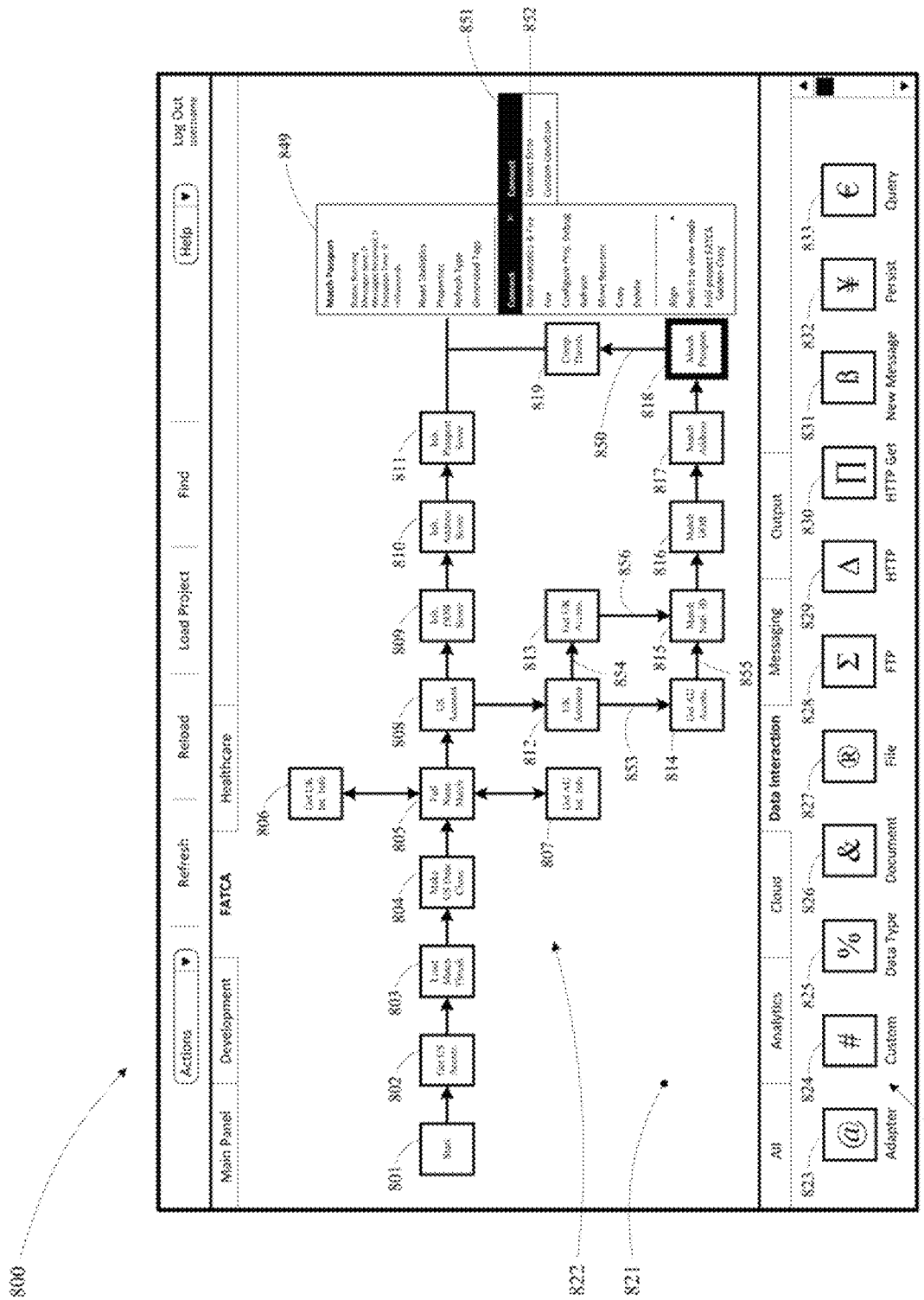
FIG. 8C shows an example options menu available to the network designer for effecting connections between neurons in a design studio.

With reference to FIG. 8C, graphical interconnection of neuron icons 801-820 on the canvas 821 dictate origin, destination, and content of self-describing messages passed between underlying corresponding neuron instances. The network designer graphically interconnects underlying corresponding neurons instances using the graphical user interface 800 by selecting the desired "From" neuron icon, e.g., "Match Passport" neuron icon 818, selecting the desired "To" neuron icon, e.g., "Compare Threshold" neuron icon 819, then selecting the type of connection between the two from a menu 849 presented to the network designer. The graphical interconnection, shown by arrowed path 850 between these neuron icons 818, 819 (and similarly between any neuron icons 801-820) indicates that the neuron underlying the "From" icon 818 is the origin point of a self-describing message, and that the neuron underlying the "To" icon 819 is the destination point of that self-describing message. In another implementation, the interconnection process is operated by selecting the "From" neuron icon 818 via left-click, selecting the "To" neuron icon 819 by Ctrl-right-click, then selecting from the pop-up dialog (see FIG. 9C) as to the nature of the connection. Several connection types are configurable including normal 851 and error subroutine call 852; the latter is the path for messages to follow if an error condition is triggered during execution of the "From" neuron 818. Multiple message paths from a single "From" neuron to multiple "To" neurons may be established, as from, e.g., "UK Account" neuron icon 812, shown by multiple parallel or branching paths 853, 854. Similarly, multiple message paths to a single "To" neuron from multiple "From" neurons may be established, as to, e.g., "Match National ID" neuron icon 815, shown by multiple parallel or converging paths 855, 856. When these selections are completed, a path 850 is shown between the two neuron icons 818, 819. Corresponding message paths are established between the underlying corresponding neuron instances represented by the two icons 818, 819, and this connection information is stored in the configuration database 501. The path is effected by message service 306 passing self-describing messages from the "From" neuron to the "To" neuron.

Figure 9A:
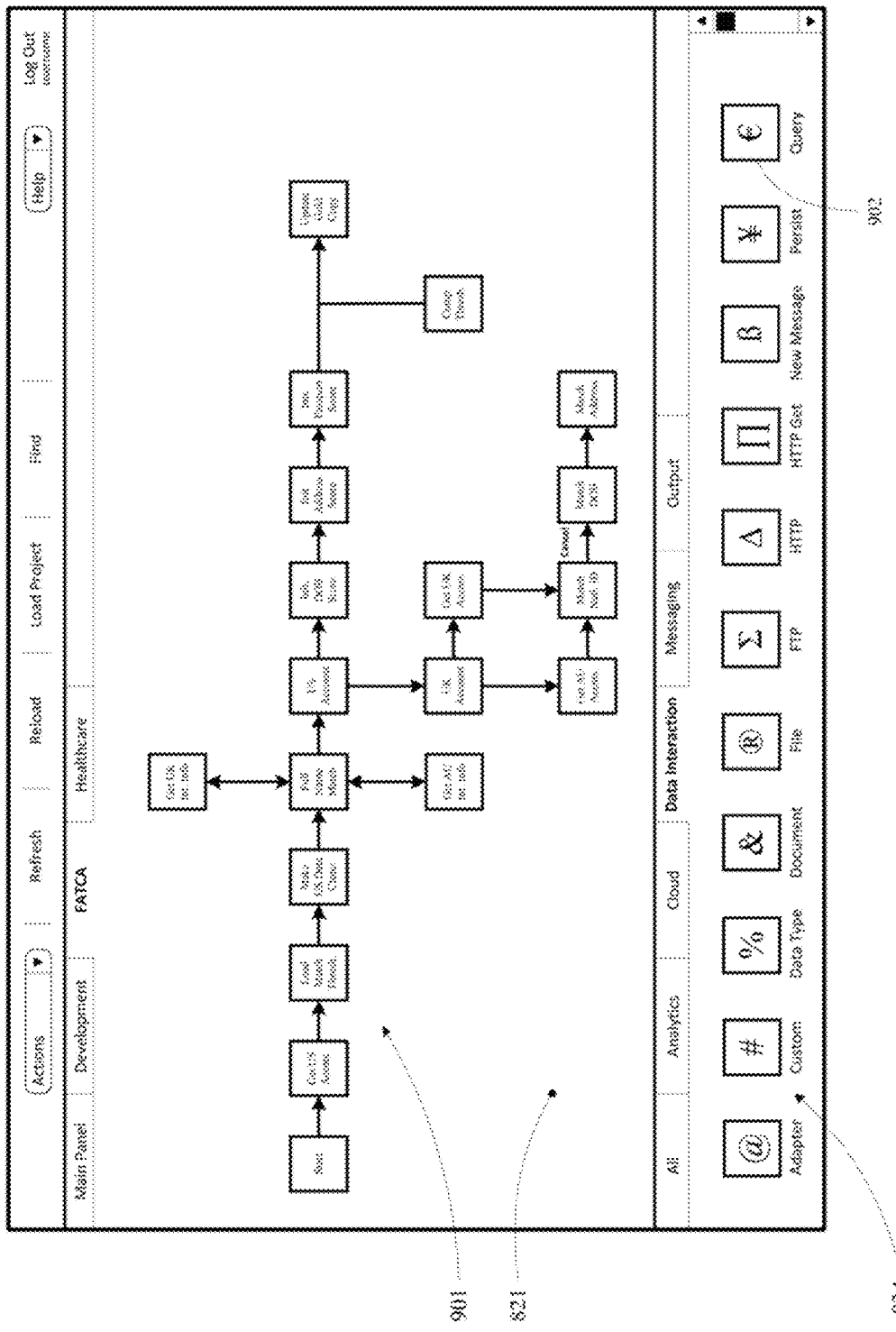
FIG. 9A illustrates a first step in the addition of a new neuron instance to a neuron network in a design studio.
Figure 9B:
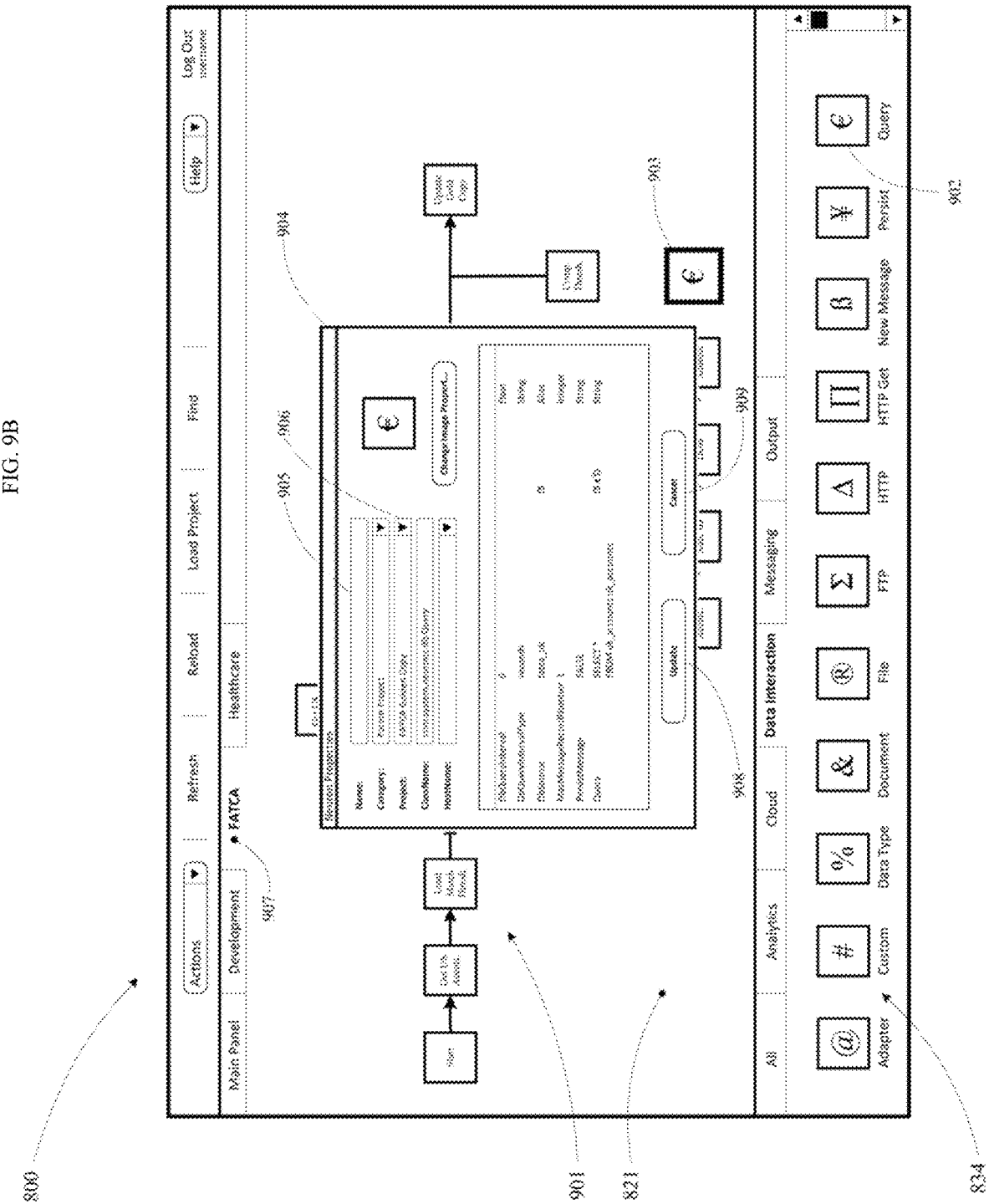
FIG. 9B illustrates a second step in the addition of a new neuron instance to a neuron network in a design studio.

FIGS. 9A-9B illustrate the addition of a new neuron instance to a neuron network 901 using graphical user interface 800. In FIG. 9A, in a first step, the canvas 821 is ready to build a new or extended network 901 with a neuron type selected from the palette 834 of available neuron types (e.g. a Query neuron 902 from the Data Interaction category 837 subset).

In FIG. 9B, in a second step, a Query neuron 902 is selected from the palette 834 and dropped on the canvas 821. Dropping the Query neuron 902 to the canvas 834 places an icon 903 on the canvas 834 representing a new instance of the Query neuron type, and configuration database 501 is updated to include a corresponding new instance of the Query neuron. A configuration dialog box 904 is presented, (similar to configuration dialog box 840 as discussed with reference to FIG. 8B) that allows naming and other configuration for specific values and behaviors of the newly added neuron instance represented by icon 903. Some configuration fields may have no default values, such as neuron name field 905; while others may be pre-populated based on context, such as the neuron project field 906, which is shown pre-populated with the name of the project associated with the tab 907 of canvas 821 to which icon 903 has been added. Values for each field may be required, or not, based on the neuron type. The entered configuration values of are immediately promulgated to the configuration database 501 when the network designer selects Update button 908. Selecting cancel button 909 does not promulgate the entered field values to the configuration database 501. In this instance of initial configuration of a newly added neuron, selecting cancel button 909 additionally deletes the neuron instance associated with icon 903 from configuration database 501, and removes icon 903 from canvas 821.

Placement and configuration operations here may be generalized as placing a first icon representing a first neuron instance within a graphical user interface; placing a second icon representing a second neuron instance within the graphical user interface; indicating a connection between the first and second icons within the graphical user interface; and modifying a variable (such as those of configuration dialog box 840) of the first neuron instance by access to the variable through the first icon.

Message Passing

Action within system 100 is event driven, and a message may act as a triggering event to launch a neuron. When an incoming message arrives at a server layer 102 hosting the message's target neuron it is enqueued by message service 306 in a message queue. When the message reaches the front of the queue, the execution manager 401 allocates a processing thread and launches that target neuron with its specifically configured instruction set. The incoming message also is provided to that instance so that the incoming message's data payload can serve as inputs to the neuron instance. When a given neuron completes its processing the processor thread is de-allocated by the neuron server and thus available for re-use.

Figure 10:
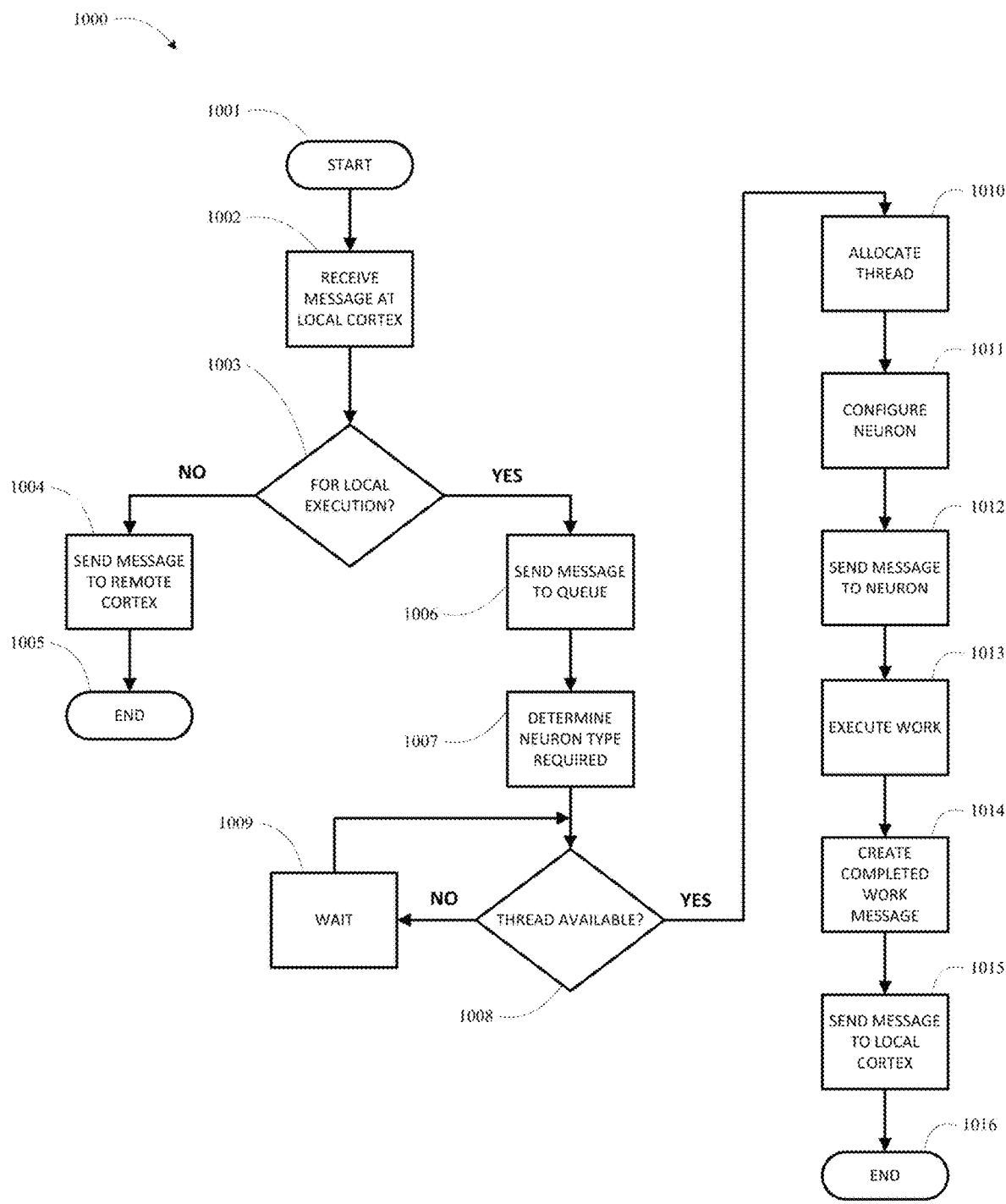
FIG. 10 is a process block diagram of the process of message passing between neuron instances in a neuron network.

Referring now to FIG. 10, a flowchart of the process 1000 of message passing between neuron instances in a neuron network is presented. The process is initiated, and available during runtime at START block 1001. The process is entirely event driven, with the trigger event being the arrival of a message. In process block 1002, a message arrives at the local server layer (cortex) 102. At decision block 1003, it is determined whether the message is to be executed locally. If this determination is NO, at process block 1004, the message is sent to the remote server layer (cortex) 102 on which it is intended to execute, and the passing of the message is completed at END block 1005. If the determination made at decision block 1003 is YES, at process block 1006, the message is enqueued in a message queue behind other previously enqueued messages until the message reaches the front of the message queue. At process block 1007, the type of neuron required to execute the message is determined. At decision block 1008, it is determined whether there is a thread available for a neuron of the type required to execute the message. If this determination is NO, then the system waits at process block 1009 until such a thread is available. If the determination at decision block 1008 is YES then at process block 1010, a thread is allocated to a neuron instance of the required type. At process block 1011 the neuron instance is configured with configuration data for the particular neuron instance retrieved from configuration database 501. Once the neuron instance is configured, at process block 1012 the message is passed from the message queue to the configured neuron instance. At process block 1013, the neuron instance executes on the work payload of the message. At process block 1014, when the work is complete, the neuron instance creates a completed work message including the results, if any, of that work. At process block 1015, the completed work message is sent to the local server layer (cortex) 102 for delivery to the next neuron in the network. The passing of the message is then completed at END block 1016.

Enforcing Sequential Dependencies

A segment of a neuron network can be required to complete all internal messaging before any message is passed to subsequent downstream neurons, initiating their execution. This is accomplished by bracketing the desired network segment with a pair of start transaction and check transaction neurons. For example, the golden copy generation network of FIG. 7 would be a reasonable candidate for such sequential dependency bracketing, as a network designer would want to ensure that the golden copy was complete before other operations were run against it. Thus, sequential dependencies can be designed into a neuron network.

Figure 11:
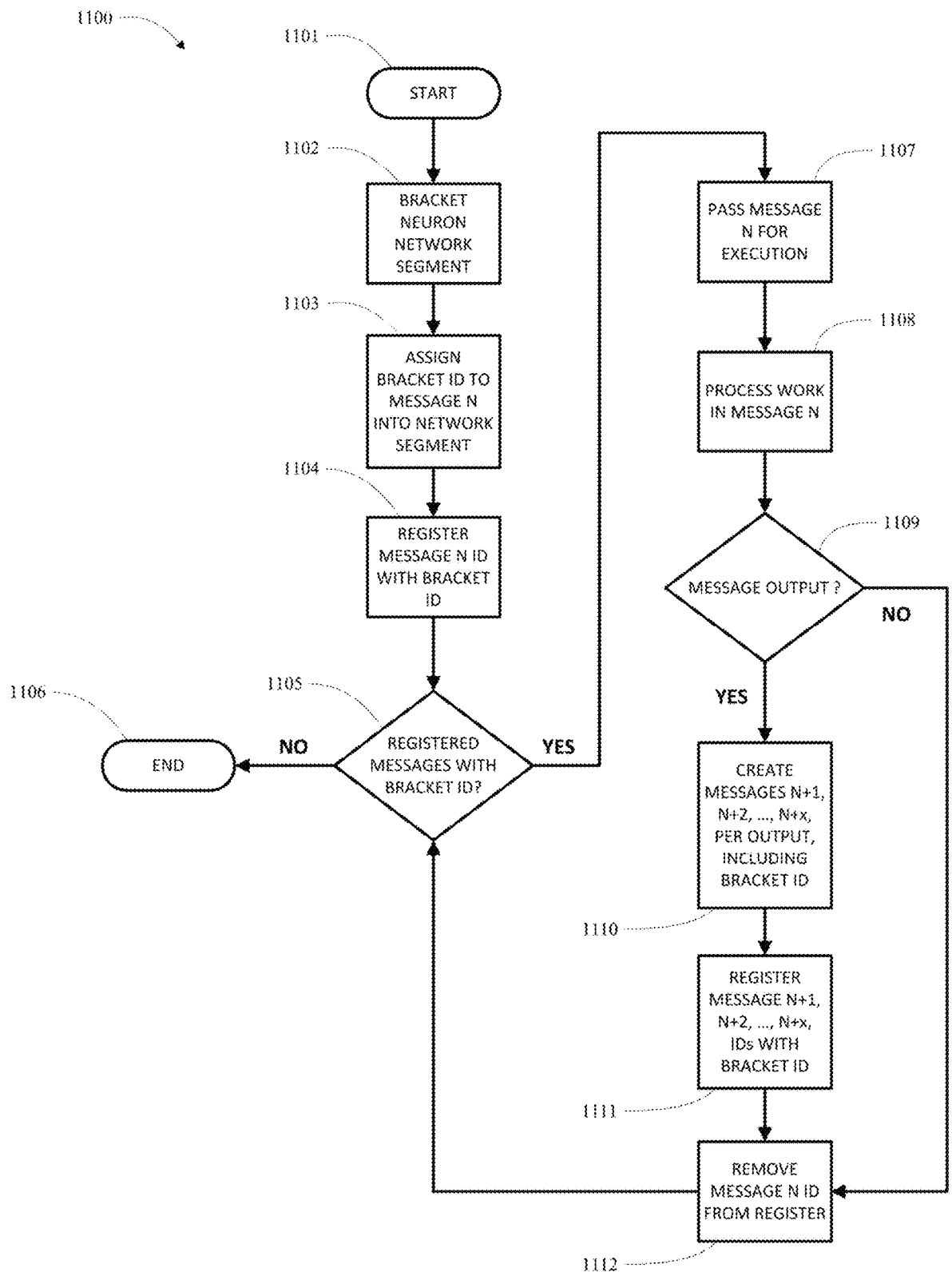
FIG. 11 is a process block diagram of the process of enforcing sequential dependencies between neuron network segments.

Referring now to FIG. 11, a flowchart of the process 1100 of enforcing sequential dependencies between neuron network segments is presented. The process begins at START block 1101. At process block 1102, network designer establishes the neuron network segment which must complete before downstream neuron networks may commence processing by bracketing the beginning of that network segment with a start transaction neuron instance, and bracketing the end of that segment with a check transaction neuron instance. At process block 1103, a message N passed into the bracketed network segment through the start transaction neuron instance is assigned a common bracket ID. At process block 1104, the unique message identifier of the message N is registered as associated with the common bracket ID. At decision block 1105, the register of message identifiers is checked to determine if there is any unique message identifier associated with the common bracket ID. If this determination is NO, the process terminates at END block 1106. If the determination of decision block 1105 is YES, then at process block 1107, the message N is passed for execution, and executed at process block 1108.

At decision block 1109, it is determined whether the execution of the message N produced any outputs. If this determination is YES, then at block 1110, new output messages N+1, N+2, ..., N+x, are created for each output of the execution of message N, each of which are assigned the common bracket ID. At process block 1111, each output message is registered as associated with the common bracket ID, incrementing the 'in-flight' message IDs in the register. At process block 1112, message N, having been executed, is retired and its ID removed from the register, decrementing the 'in-flight' message IDs in the register. If the determination of decision block 1109 is NO, then blocks 1110 and 1111 are skipped, and message N is simply retired and its ID removed from the register at process block 1112. The process reiterates from decision block 1105 until, after neurons in the network segment have ceased generating new output messages, and all messages associated with the common bracket ID are removed from the register.

Reaching END block 1106 thus indicates completing the precursor tasks of the sequential dependency, and the check transaction neuron passes a message indicating that completion to the next downstream neuron instance(s), triggering its operation and allowing the system to begin subsequent sequentially dependent tasks.

Enhanced Clustering

Hosts (also "cortexes" or "server layers", as previously discussed) 102 can be organized into clusters for more complex processing needs, to distribute work across multiple compute resources available within a target processing environment, to implement high-availability execution, or otherwise as desired in a particular implementation. Clusters are configured in administrative control module 203. Multiple hosts 102 operating on one or more machines are configured to be opted-in to the cluster as worker nodes. Various neuron networks are assigned as eligible to run on one or more of the opted-in hosts 102, and each combination of neuron network and host 102 is given a priority range.

A cluster may be configured in administrative control module 203. A cluster is defined by configuration of a variable for Cluster Name, Communication Alias, Data Entry Alias, Dispatching Algorithm, Priority Algorithm, Transaction ID, and an Active Cluster Flag. The cluster name is a user-friendly designation for a numerically identified cluster. This name is shown to reference the cluster wherever the system provides information to the user regarding the cluster, such as in consoles, logs, and usage reports.

The communication alias dictates the communications path between and among all dispatcher and worker hosts within a configured cluster. Each dispatcher and worker host within a cluster subscribes to a message publishing and subscription service topic, for example a Java Messaging Service topic, unique to that cluster. This unique communications topic provides a pathway both for units of work to be dispatched within the cluster as messages to worker hosts, and for the sharing of system health and status messages among all cluster elements. The communication alias is a pre-configured connection to this communications topic for the cluster. Messages used for intercommunication as a cluster are published and received by each dispatcher and worker host of the cluster to and from that unique topic.

Similarly, the data entry alias dictates the communications path for work requests to enter the cluster. Each dispatcher host within the cluster subscribes to a message publishing and subscription service topic uniquely set aside to pass units of work into that specific cluster. This message publishing and subscription service may be the same as, or distinct from the message publishing and subscription service connected to through the communication alias, although the data entry topic for the cluster is always distinct from the communications topic for the cluster. The data entry alias is a pre-configured connection to this data entry topic for the cluster. The master (and slave) dispatcher hosts of the cluster will collect messages sent to the cluster by this topic. Messages delivered on this data entry topic arrive and await entry to the cluster in a queue (such as a JMS queue) external to the cluster. The dispatcher hosts of the cluster each subscribe to all messages with the data entry topic that are placed on that queue. When a message with the data entry topic appears on the queue, the dispatcher hosts will extract that message from the queue and then inject it into the cluster for processing by way of the communications topic.

The dispatching algorithm indicates how the dispatcher host of the cluster will select a worker host within the cluster to execute work requested by a message. The priority algorithm defines the order of execution of the units of work that arrive at the cluster. The transaction ID is used to track a unit of work through execution. The Active cluster flag, when set to false, allows the user to suspend execution of the cluster without actually deleting it.

Figure 15:
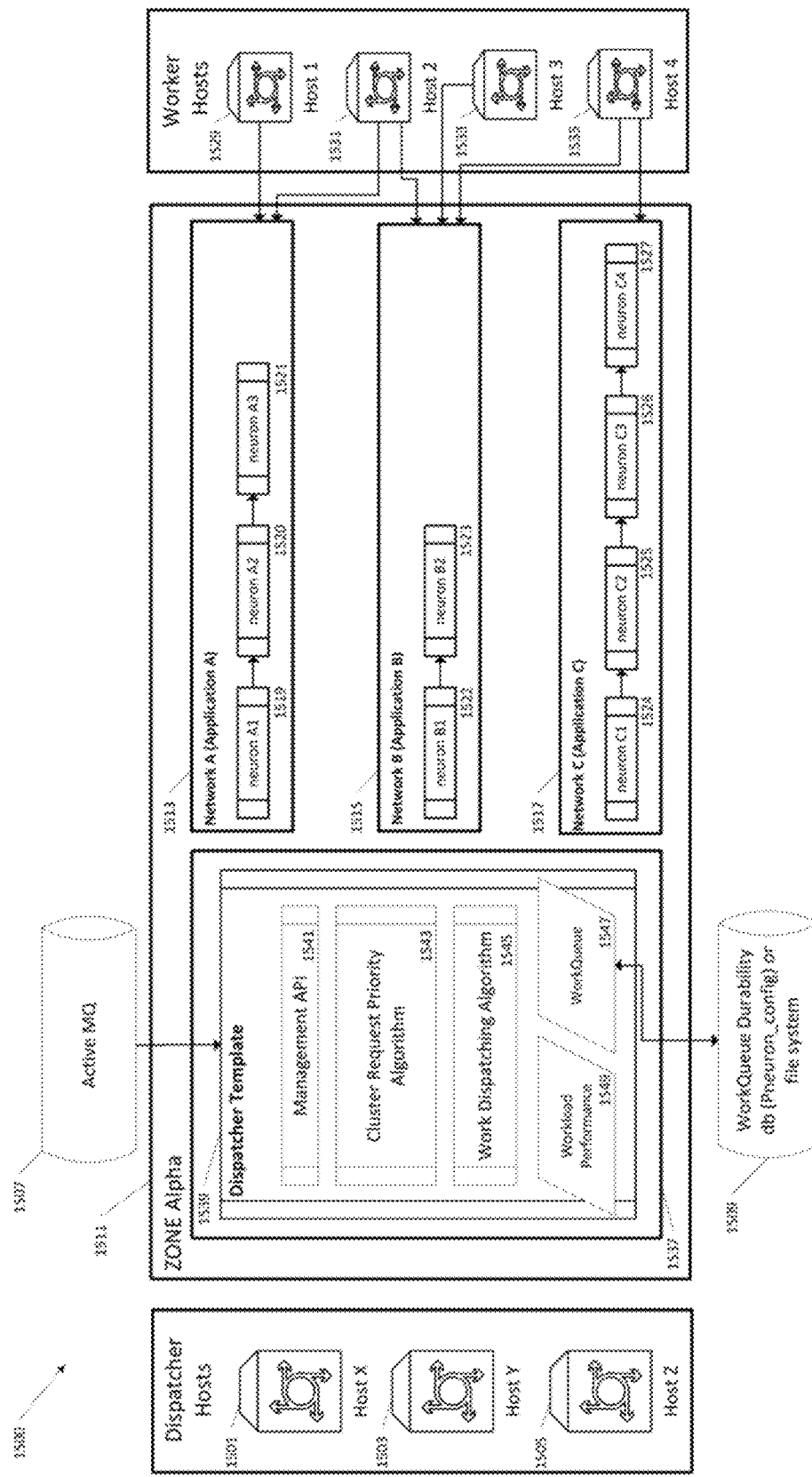
FIG. 15 shows a system block diagram of an exemplary zone-enhanced cluster.

Referring now to FIG. 15, a system block diagram of an exemplary cluster system 1500 is shown. The cluster system includes dispatcher hosts 1501, 1503, and 1505; data entry queue 1507; work queue data store 1509, which may be the neuron configuration database 501, or another data store as appropriate; a cluster 1511; various opted-in neuron networks 1513, 1515, 1517 each comprising various interconnected neurons 1519-1521, 1522-1523, 1524-1527; worker hosts 1529, 1531, 1533, 1535; and dispatcher 1537. The dispatcher hosts 1501, 1503, 1505, are automatically "opted-in" to (configured as belonging to) the cluster at configuration. The worker hosts 1529, 1531, 1533, 1535, are opted-in to the cluster manually by the user 1511 during configuration. This opting-in association for the worker hosts 1529, 1531, 1533, 1535 may occur only once for any given application (template neuron network), although a worker host 1529, 1531, 1533, 1535 may be opted in to more than one application (template neuron network). The opting-in association with an application (template neuron network) is defined by a friendly worker host name, a flag indicating whether the worker host is in the generic pool or not, and a filter condition describing what units of work are eligible to be performed by the application (template neuron network). When the generic pool flag of a worker host is set to true, if the dispatcher is unable to find any worker host 1529, 1531, 1533, 1535 that is running to suit its filtering condition it will check all the worker hosts 1529, 1531, 1533, 1535 that have this flag set and send the unit of work to one of them based on the dispatching algorithm it is running.

The dispatcher 1537 includes a management API 1541, a cluster priority algorithm 1543, and a work dispatching algorithm 1545. The dispatcher 1537 logs and has access to workload performance 1549 of all worker hosts 1529, 1531, 1533, 1535 in the cluster 1511, and has access to the work queue 1547 for the cluster 1511. Work queue 1547 maintains all units of work directed to the cluster 1511, both pending and "in-flight" (being executed by a neuron network in the cluster). The status of work queue 1547 is dynamically maintained by the dispatcher 1537 as units of work are completed. Overflow of the work queue 1547 is stored in work queue data store 1509.

The cluster 1511 provides a layer of abstraction away from the underlying hosts 102. The configuration of the cluster 1511 includes mapping of the opted-in neuron networks 1513, 1515, 1517 to the worker hosts 1529, 1531, 1533, 1535, and mapping of the dispatcher 1537 to the dispatcher hosts 1501, 1503, 1505. Thus, a cluster can be distributed across virtually any physical network topology Certain problems are solved by, and certain applications are executed by, unique neuron network configurations. For example, example neuron network 700 discussed with reference to FIG. 7 above operates to generate a global "golden copy" of an enterprise's global account data. Similarly, neuron network A 1513 is uniquely configured to solve problems of type A, neuron network B 1515 is uniquely configured to solve problems of type B, and so on. However, repeated configuration of the same neuron network 1513, 1515, 1517 (or subnetwork) for each server layer (also known as a cortex or a host) 1529, 1531, 1533, 1535 is unnecessarily burdensome to that worker host 1529, 1531, 1533, 1535. Therefore, a neuron network 1513, 1515, 1517 for any given process may be stored as a template network in the neuron configuration database 501 (or other data store as may be appropriate) and instantiated within a host 1529, 1531, 1533, 1535 when called for.

Template networks are stored with their individual neurons fully configured: all configurable properties of included neurons are established and all interconnections with other neurons are indicated. The template network is defined by a cluster template network friendly name, a project with which the template network is associated, a neuron entry point indicating the start of the template network, an identification script for evaluating compatibility of the template network and an incoming unit of work, and a transaction ID and Active Network flag each similar in application to those applied to the cluster as described above. However, no specific host 102 is defined for the neurons included in the template network. The target worker host 1529, 1531, 1533, 1535 is indicated at instantiation of a neuron network from the template network, and the neuron network is deployed to the indicated target worker host 1529, 1531, 1533, 1535. In this way, the neuron networks are virtualized.

For example, neuron network A 1513 is shown as deployed on worker host 1 1529 and worker host 2 1531; neuron network B 1515 is shown as deployed on worker host 2 1531, worker host 3 1533, and worker host 4 1535; and neuron network C 1517 is shown as deployed only on worker host 4 1535. Instantiation of neuron networks from a template network ensures changes made to the template network is propagated across every neuron network instantiated from that template network in any host 102. This removes the possibility that a neuron network for a certain function can be individually forgotten or misconfigured.

Similarly, a dispatcher 1537 can be stored as a template 1539. The dispatcher may be a neuron, or may be another component of the system. The dispatcher 1537 is managed by the Cortex within the Business Logic Service 403, and handles the dispatching of messages across any hosts 102 configured to be opted-in to a given cluster 1511, with the hosts 102 themselves providing the processing resources for execution of virtualized neural networks such as neuron network A 1513. The dispatcher is hosted on any one of the hosts 102 designated a dispatcher host 1501, 1503, and 1505. The dispatcher 1537 may be a master or slave dispatcher. Each cluster has a master dispatcher, and may be provided with one or more slave dispatchers. The slave dispatchers mimic the operation of the master dispatcher, with the master dispatcher hosted on a first dispatcher host, e.g. dispatcher host X 1501, and slave dispatchers hosted on separate hosts, e.g. dispatcher host Y 1503 or dispatcher host Z 1505 for redundancy. In the event of a failure of the master dispatcher (i.e. in the event the master dispatcher cannot be communicated with), a slave dispatcher can take over the cluster 1511 with no loss of information.

The dispatcher 1537 is the entry point to the cluster 1511 for all work request messages. As units of work arrive in work request messages to the cluster from the data entry topic, they are held outside the cluster in data entry queue 1507. The dispatcher 1537 retrieves each of these messages in turn, and evaluates the priority of the work request with cluster request priority algorithm 1543. The request messages are then placed into work queue 1509 in accordance with the results of their evaluation against cluster request priority algorithm 1543. The cluster request priority algorithm 1543 thus controls the order of execution of the units of work that arrive at the cluster in work request messages. FIFO (First In, First Out) is commonly employed, but other algorithms such as LIFO (Last In, First Out), Priority Queue, Fair Queueing, Weighted Fair Queueing, Earliest Deadline First, Shortest Job First, Shortest Remaining Time or others, may be selected as the user may desire for a given use of the cluster.

The request messages for units of work are retrieved from the front of the work queue 1509 by the dispatcher 1537. The dispatcher 1537 then provides runtime filtering of compatible worker hosts 1529, 1531, 1533, 1535 available to perform the work based on message attributes in the request message. This runtime filtering of compatible worker hosts is a two stage process. The dispatcher 1537 first determines the type of neuron network needed to complete the unit of work. The dispatcher 1537 then determines which worker hosts are eligible to be assigned that unit of work.

In the first stage the dispatcher 1537 determines which applications (neuron networks) are to be executed for a given unit of work. To accomplish this, the dispatcher 1537 will extract message attributes of the work request message that will be used in evaluating the identification script of each application (neuron network) available in (opted-in to) the cluster. These extracted message attributes may be referred to as filter attributes, and include such information as assigned priority. Each of these filter attributes may be specifically included in the message for application of identification scripts, or may serve other purposes in the message and used only incidentally for application of identification scripts.

The identification script is a programming language expression that returns a "True" or "False" condition based on the script evaluation when using the filter attributes. This identification script is effectively the on/off switch as to whether that application is run on an arriving unit of work or not. If an identification script evaluates to true for an application (neuron network) when using those filter attributes, then the associated application (neuron network) is to be executed to perform the requested unit of work, and that application (neuron network) is added to a list of required applications. Thus, by specifying the identification scripts for each application at configuration, the administrator can direct zero, one, many, or all of the applications (neuron networks) available in a cluster to be compatible to receive a specific unit of work. With the list of required applications created, stage two of dispatching is then applied.

In the second stage there are two filtering steps where ultimately zero, one, or multiple worker nodes are identified as eligible to be assigned that unit of work for that application. For each cluster, the dispatcher maintains a table of opted-in worker hosts associating them with applications assigned to them, for example in configuration database 501. In the first filtering step, for each required application of the incoming unit of work the cluster's table of opted-in worker hosts and their assigned applications is consulted to determine which opted-in worker hosts, if any, are assigned the required application. The result of that look-up is an initial list of eligible hosts.

In the second filtering step the same table of opted-in worker hosts is consulted. The table also maintains configured priority ranges of each opted-in worker host. Assigned priority, one of the attributes of the incoming request message for a unit of work, is matched against the configured priority ranges assigned to the worker hosts assigned to the required application. By evaluating the initial list of eligible hosts the priority range of each is assessed against the unit of work priority and ineligible hosts are then filtered out. The identification script assigned to each opted-in application (neuron network) thus dictates which networks will be instantiated and executed for an incoming unit of work.

The dispatcher finally evaluates which of the available worker nodes should receive the unit of work with work dispatching algorithm 1545. Work dispatching algorithm 1545 is determined at configuration, before runtime, and include "shortest queue" and "performance dispatcher" (shortest estimated time to completion) type algorithms, as well as other algorithms that may be custom prepared by the user. Applying a shortest queue algorithm to the cluster directs the master dispatcher of the cluster to, for each incoming work request message, determine, from the final set of eligible hosts having completed both network assignment and priority-range filtering, the worker host in the cluster with the smallest number of "in-flight" or uncompleted work request messages already directed to it, and to dispatch the incoming work request message to that worker host. Applying a performance dispatcher algorithm to the cluster directs the master dispatcher of the cluster to, for each incoming work request message, determine, from the final set of eligible nodes having completed both network assignment and priority-range filtering, the fastest worker host in the cluster based on actual runtime performance over a configurable period of time, and to dispatch the incoming work to that worker host.

With these evaluations completed, the dispatcher designates the unit of work to be performed by a particular neuron network 1513, 1515, 1517 and both updates the status of that unit of work in the work queue 1547 as well as sending the unit of work in a message across the message delivery and subscription service communications topic of the cluster to the selected worker node 1529, 1531, 1533, or 1535 to initiate execution.

Load balancing with pre-filtering in the cluster spreads work more evenly across the available hosts, regardless of the underlying hardware. Thus, the dispatcher operates to distribute work intelligently across the hosts of the cluster, and minimize underutilization of hosts in the cluster. Thus, the dispatcher assists in implementing network parallelism and load balancing by evaluating all eligible nodes for the given type of work, assigned priority range(s), and loading on active nodes (for example by either queue length or recent throughput performance).

Each incoming work request message placed in the work queue 1509 is labeled with a common cluster ID and bears a status of "incomplete." The cluster ID associates the unit of work with the cluster, informing other parts of the system that the message bearing the unit of work belongs to the cluster. Each work request message retrieved from the work queue 1509 is labeled with a unique execution ID by the dispatcher. This execution ID is also applied to every spawned child of the work request message as the unit of work is processed. This allows a unit of work to be tracked during execution, and allows the unit of work (and its child processes) to be distinguished from other units of work (and their child processes) being executed within any application (neuron network) 1513, 1515, 1517 in the cluster 1511. When the execution ID no longer appears in the list of active messages flowing through an application (neuron network), the cluster 1511 concludes that the unit of work identified by the execution ID is complete. The status of the associated work request message in work queue 1509 is then changed to "complete."

The tracking of the execution ID further allows "kill transaction" actions to be implemented within the cluster 1511. Using a cluster management API or the administrative control module 203 web application, an authorized user can view the in-flight or awaiting execution units of work and issue a "kill transaction" command. If the unit of work is already dispatched, the execution ID allows the cluster 1511 to delete all active messages associated with the unit of work. If the unit of work has not yet been dispatched, then the "kill" function only needs to delete it directly from the work queue 1509. Tracking of the Execution ID also permits execution statistics to be gathered on the unit of work, such as when the message bearing it was injected into the cluster 1511, how long it took to complete execution of the unit of work, on which worker host 1529, 1531, 1533, 1535, neuron network 1513, 1515, 1517, and individual neuron the unit of work was executed.

The tracking of the execution ID also allows host performance data to be obtained. Tracking day and time of performance of execution of a unit of work through an application (neuron network) allows administrators to understand the loading or performance of the cluster 1511. Tracking the requestor injecting the unit of work allows administrators to understand what or who is driving processing demand on the cluster 1511. Tracking payload size (number/size of inputs in the unit of work) allows administrators to understand how message size impacts cluster performance at the cluster, application or worker node level. Some or all of this available information may be provided to the dispatcher as workload performance 1549 information. In particular, for each unit of work, time to complete and host assigned to the unit of work are necessary statistics that enable the shortest predicted time to completion dispatch algorithm.

Figure 14:
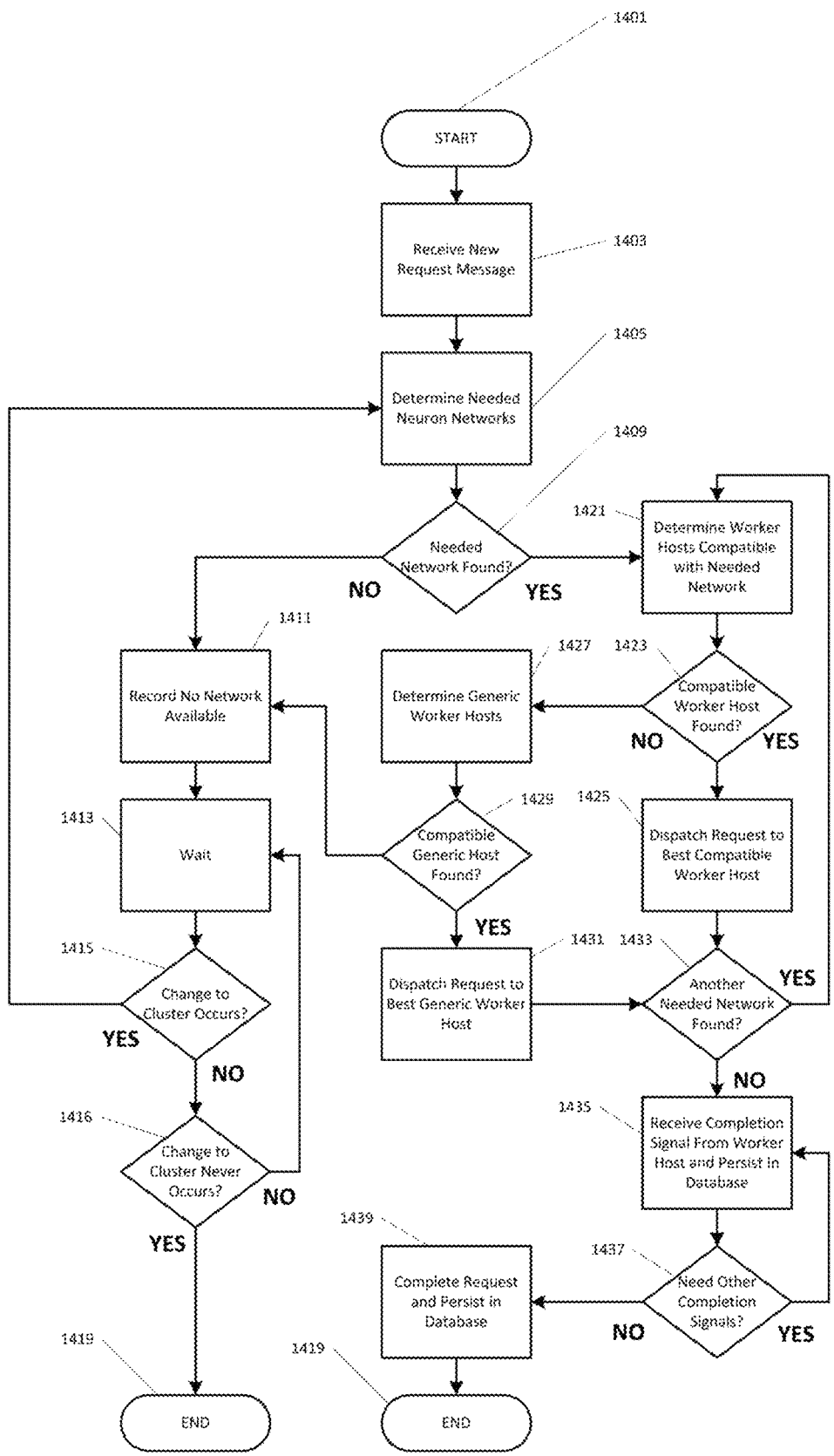
FIG. 14 shows a process block diagram of the data flow in dispatching work in a clustered environment.

Referring now to FIG. 14, a process block diagram of a process 1400 for dispatching work in a clustered environment is presented. Processing begins at start block 1401. At process block 1403, a new work request message is received in a cluster's data entry queue. The master dispatcher of the cluster may persist this message to a database for durability. Processing continues at process block 1405. The master dispatcher of the cluster determines what applications (neuron networks) that are opted-in to the cluster must be executed in order to complete the requested work. The master dispatcher can determine that none, one, several, or all applications available in the cluster are required, based on the applied filtering conditions. Processing continues at decision block 1409. If no needed applications are found within the cluster, processing continues at process block 1411. If needed applications are found within the cluster, processing continues at process block 1421.

At process block 1411, the status of the work request message is recorded as having no application or host, because no needed application was opted-in to the cluster. This may be recorded in a durability table, or otherwise. Processing then continues at process block 1413, where the process waits for a predefined wait period to allow for a potential change in the cluster. A change in the cluster occurs when the cluster is re-formed, the configuration of the cluster changes, or a host joins or leaves the cluster. Processing continues at decision block 1415, where, in the event that a change to the cluster does occur, the process returns to process block 1405, for reevaluation as to whether any application available in the cluster must be executed to complete the requested work. In the event that a change to the cluster does not occur, processing continues at decision block 1416. At decision block 1416, the cluster is evaluated to determine if the cluster has been terminated or set as inactive, meaning that a change to the cluster that allows for processing of the work request message will never occur. If a change to the cluster may yet occur, processing returns to process block 1413 for another wait period. If a change to the cluster will never occur, processing terminates at end block 1419.

Following the alternative branch from decision block 1409, if needed applications are found within the cluster, processing continues at process block 1421. At process block 1421, all worker hosts within the cluster that are compatible with the work request message are identified based on the filter condition set for each worker host. The filter condition is a logical condition that, when applied to the incoming work request message, evaluates to "true" if the worker host is compatible with (i.e. is capable of performing the work requested within the parameters established by) the work request message. Processing continues at decision block 1423. If a compatible worker host is found, processing continues at process block 1425. If a compatible worker host is not found, processing continues at process block 1427. At process block 1425, the work request message is dispatched to the best compatible worker host, according to the dispatch algorithm of the dispatcher. Further, in order to track work requests that are dispatched but not yet completed, an in-flight counter is incremented. Processing continues from process block 1425 to decision block 1433.

At process block 1427, all worker hosts within the cluster that have the generic pool flag set to true are identified. Processing continues to decision block 1429. If at least one worker host has a generic pool flag set to true, processing continues to process block 1431. If no worker host has a generic pool flag set to true, processing continues at process block 1411. At process block 1431, the work request message is dispatched to the best generic pool worker host, according to the dispatch algorithm of the dispatcher, and the in-flight counter is incremented. Processing then continues from process block 1431 at decision block 1433.

At decision block 1433, if an additional needed network is found within the cluster, processing returns to and continues at process block 1421. If no additional needed network is found within the cluster, processing continues from process block 1433 to process block 1435. At process block 1435, the dispatcher waits for a completion signal from the hosts it has dispatched a work request message to. These completion signals indicate that execution of the neuron network on the work request message at the host is completed. These signals may arrive before all dispatches for a work request message are completed. When the dispatcher receives a completion signal, the completion signal is persisted in the database, the in-flight counter is decremented, and processing continues at decision block 1437. At decision block 1437, it is determined whether there are further completion signals still outstanding by determining whether the in-flight counter has reached its base case (usually 0) prior to incrementation due to outgoing dispatches. If there are completion signals still outstanding, the process returns to process block 1435 to await the next completion signal. If there are no completion signals still outstanding, processing continues at process block 1439.

At process block 1439, the dispatcher persists the completion of the work request message into the database. Processing then completes at end block 1419.

Realm Management

A realm manager manages scalable compute resources to be dynamically added to a defined cluster if the dispatcher queue in front of the cluster achieves a configured length. The realm manager is part of server layer (cortex) 102 and is configurable in administrative control module 203. When the queue returns to normal levels the dynamically added capacity is released out of the cluster. These interactions are with a cloud management system to allocate the dynamic capacity, e.g. Amazon Web Services.

Figure 12:
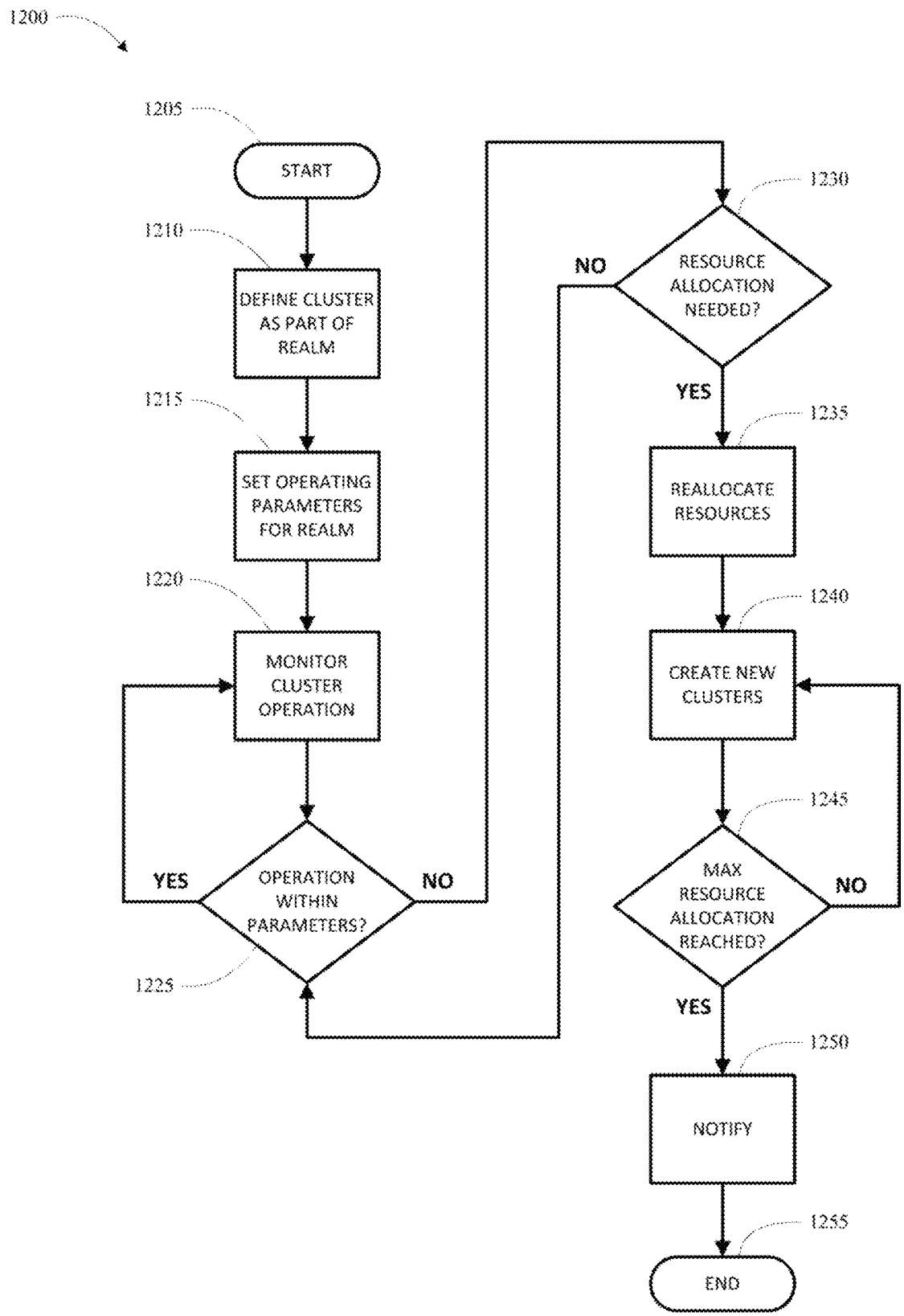
FIG. 12 is a process block diagram depicting a process 1200 that can be used to work with one or more clusters as part of a realm.

FIG. 12 is a flow diagram depicting a process 1200 that can be used to work with one or more clusters as part of a realm. Processing begins at START block 1205 and continues to process block 1210. At process block 1210, one or more clusters are defined as part of, or otherwise associated with, a realm. Processing continues to process block 1215 where a set of operating parameters is defined for the realm. Examples of such operating parameters can include a number of virtual or physical machines the realm is permitted to span, processor, storage, and memory constraints, and network bandwidth constraints, among others. At process block 1220, operation of the one or more clusters is monitored for consistency with the operating parameters set at process block 1215.

Processing continues to decision block 1225 where a determination is made whether the one or more server layers (cortexes) 102 in the realm are operating within the defined parameters. If this determination is YES, processing returns to process block 1220. If the determination is NO, processing continues to decision block 1230.

At decision block 1230, a determination is made whether the availability of processing resources, such as virtual or physical machines, memory, storage, and network bandwidth, needs to be adjusted by increasing or decreasing allocations consistent with the constraints set. If this determination is YES, processing continues to process block 1235 where processing resources are allocated or deallocated, as appropriate. Processing continues at process block 1240 where one or more new server layers (cortexes) 102 are created and associated with the realm. Similarly, if the determination made at decision block 1230 is NO, processing returns to process block 1225.

From process block 1240, processing continues at decision block 1245 where a determination is made whether a maximum resource allocation limit for the realm has been reached. If this determination is NO, processing returns to process block 1220. If the determination is YES, processing continues to process block 1250 where a resource limit notification is sent. Processing of the method 1200 concludes at END block 1255.

General Computer

Figure 13:
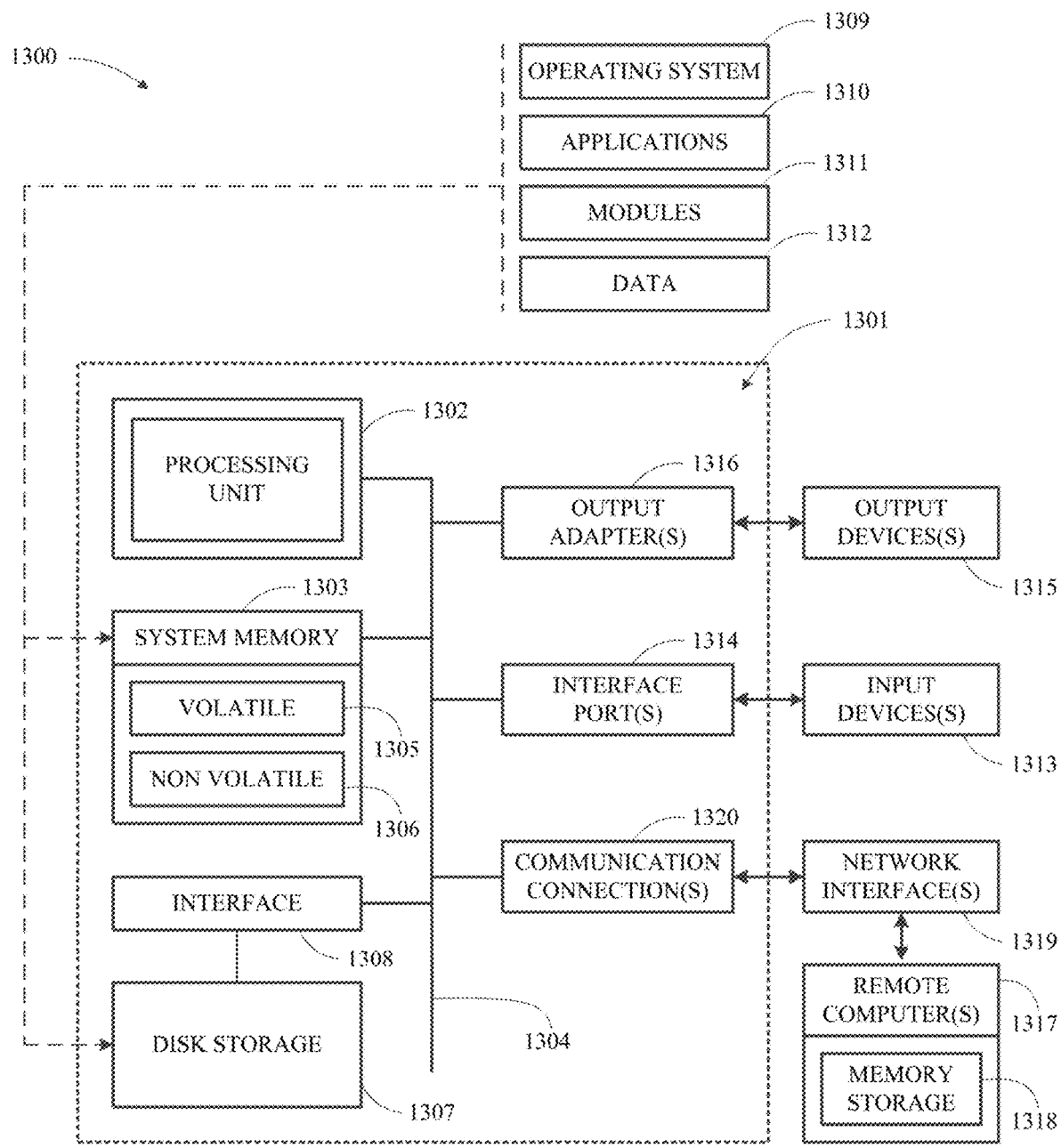
FIG. 13 shows a system block diagram of an exemplary computing environment.

FIG. 13 shows a block diagram of an exemplary computing environment 1300, which includes a general computer 1301. General computer 1301 includes a processing unit 1302, a system memory 1303, and a system bus 1304. The system bus 1304 can couple system components including, but not limited to, the system memory 1303 to the processing unit 1302. The processing unit 1302 can be any of various available processors. Dual microprocessors, multiple core microprocessors, and other multiprocessor architectures also can be employed as the processing unit 1303.

The system bus 1304 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1303 includes volatile memory 1305 and nonvolatile memory 1306. The basic input/output system (BIOS), containing the basic routines to transfer information between elements within the general computer 1301, such as during start-up, is stored in nonvolatile memory 1306. For example, nonvolatile memory 1306 can include read only memory (ROM), programmable ROM (PROM), electrically programmable ROM (EPROM), electrically erasable ROM (EEPROM), or flash memory. Volatile memory 1305 can include random access memory (RAM), which can acts as external cache memory. For example, RAM is available in many formats such as synchronous RAM (SRAM), dynamic RAM (DRAM), synchronous DRAM (SDRAM), double data rate SDRAM (DDR/SDRAM), enhanced SDRAM (ESDRAM) Synchlink DRAM (SLDRAM), and direct Rambus RAM (DRRAM).

General computer 1301 also includes removable/non-removable, volatile/non-volatile computer storage media, referred to generally as disk storage 1307. The disk storage 1307 includes, but is not limited to, devices like a magnetic disk drive, floppy disk drive, tape drive, Jaz drive, Zip drive, LS-100 drive, flash memory card, memory stick, or flash drive. In addition, disk storage 1307 can include storage media separately or in combination with other storage media including, but not limited to, an optical disk drive such as a compact disk ROM device (CDROM), CD recordable drive (CD-R Drive), CD rewritable drive (CD-RW Drive), a digital versatile disk ROM drive (DVD-ROM), a DVD recordable drive (DVD+R/-R), a DVD rewritable drive (DVD+RW/-RW), a Blu-ray ROM drive (BD-ROM), a Blu-ray recordable drive (BD+R/-R), a Blu-ray rewritable drive (BD+RW/-RW), or other optical storage media media. To facilitate connection of the disk storage devices 1307 to the system bus 1304, a removable or non-removable interface can be used such as interface 1308.

Software can act as an intermediary between users and the basic computer resources described in the computing environment 1300. Such software includes an operating system 1309. The operating system 1309, which can be stored on the disk storage 1307, acts to control and allocate resources of the general computer 1301. System applications 1310 take advantage of the management of resources by operating system 1309 through program modules 1311 and program data 1312 stored either in system memory 1303 or on disk storage 1307. The disclosed systems and methods can be implemented with various operating systems or combinations of operating systems.

As is well known in the field of computer science, a virtual machine (VM) is an abstraction—a "virtualization"—of an actual physical computer system, while maintaining to software running atop its platform the appearance of a hardware-based general computer 1301. Thus, one or more "guest" general computers 1301 may be implemented as virtual machine abstractions operating within a physical "host" general computer 1301.

A user enters commands or information into the general computer 1301 through input device(s) 1313. The input devices 1313 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices 1313 connect to the processing unit 1302 through the system bus 1304 via interface port(s) 1314. Interface port(s) 1314 include, for example, a serial port, a parallel port, a game port, and a universal serial bus (USB). Output device(s) 1315 use some of the same type of ports as input device(s) 1313. Thus, for example, a USB port may be used to provide input to general computer 1301 and to output information from general computer 1301 to an output device 1315. Output adapter 1316 is provided to illustrate that there are some output devices 1315 like monitors, speakers, and printers, among other output devices 1315, which require special adapters. The output adapters 1316 include, by way of illustration and not limitation, video and sound cards that provide a means of connection between the output device 1315 and the system bus 1304. Further, other devices and/or systems of devices may provide both input and output capabilities, such as remote computer(s) 1317.

General computer 1301 can operate in a networked environment using logical connections to one or more remote computers, such as remote computer(s) 1317. The remote computer(s) 1317 can be a personal computer, a server, a router, a network PC, a workstation, a microprocessor based appliance, a peer device or other common network node and the like, and typically includes many or all of the elements described relative to general computer 1301. For purposes of brevity, only a memory storage device 1318 is illustrated with remote computer(s) 1317. Remote computer(s) 1317 is logically connected to general computer 1301 through a network interface 1319 and then physically connected via communication connection 1320. Network interface 1319 encompasses wire and/or wireless communication networks such as local-area networks (LAN) and wide-area networks (WAN). LAN technologies include Fiber Distributed Data Interface (FDDI), Copper Distributed Data Interface (CODI), Ethernet, Token Ring and the like. WAN technologies include, but are not limited to, point-to-point links such as High-Level Data Link Control (HDLC), circuit switching networks like Integrated Services Digital Networks (ISDN) and variations thereon, packet switching networks such as the Internet protocol (IP) and X.25, and Digital Subscriber Lines (DSL).

Communication connection(s) 1320 refers to the hardware/software employed to connect the network interface 1319 to the bus 1304. While communication connection 1320 is shown for illustrative clarity inside general computer 1301, it can also be external to computer 1301. The hardware/software necessary for connection to the network interface 1319 may include, for example, but is not limited to, internal and external technologies such as modems (including regular telephone grade modems, cable modems and DSL modems), ISDN adapters, and Ethernet cards.

It should be remembered that every software instruction or program can be reduced to a Boolean logic circuit, by implementing well-understood processes. Thus, dedicated hardware implementations, such as application specific integrated circuits, programmable logic arrays and other hardware devices, may be constructed to implement one or more of the methods described herein. One or more embodiments described herein may implement functions using two or more specific interconnected hardware modules or devices with related control and data signals that may be communicated between and through the modules, or as portions of an application-specific integrated circuit.

It is generally desirable, however, to avoid inherent circuit design and implementation costs by implementing the systems and methods through the adaptable, flexible general computer 1301, rather than building a specific, dedicated circuit for each operation. Thus, while this disclosure discusses operations in terms of software, it is to be understood that software controls the operation of hardware in a general computer 1301, and that the operation of circuitry in accordance with the invention is contemplated whether it is dedicated circuitry, or the circuitry of one or more general computers 1301 operating in accordance with the invention.

What is claimed is:

1. A non-transitory computer readable medium including computer program instructions to cause a computing device to perform steps in a process, comprising:
    executing a plurality of configurable worker objects on execution threads;
    detecting an occurrence of an originating event;
    selecting, in response to the occurrence of the originating event, a unit of work from a queue;
    selecting, from the plurality of configurable worker objects based at least in part on an identification script, a network of configurable worker objects available to accept the unit of work, wherein network topology of the network of configurable worker objects is defined in a configuration database containing configuration information for each of the plurality of configurable worker objects, and the network topology includes unidirectional connections between the configurable worker objects in the network such that the unidirectional connections dictate direction of information flow between any two successive configurable worker objects in the network, wherein each of the configurable worker objects in the network has a software processing unit operable to perform a designated application function and is interoperable with the other configurable worker objects in the network based on the defined network topology, and wherein the network includes at least one of the plurality of configurable worker objects having a designated application function of analytics to provide data processing;
    sending the unit of work to a first of the configurable worker objects in the network that encapsulates an application function performed by the software processing unit that is capable of performing a processing task of the unit of work;
    processing the unit of work by the first of the configurable worker objects; and
    indicating, by the first of the configurable worker objects, that the unit of work has been processed.

2. The non-transitory computer readable medium of claim 1, wherein the process further comprises sending the unit of work to a second of the configurable worker objects in the network for further processing.

3. The non-transitory computer readable medium of claim 2, wherein the process further comprises indicating that processing of the unit of work by the first of the configurable worker objects and the second of the configurable worker objects has been completed.

4. The non-transitory computer readable medium of claim 3, wherein the process further comprises sending results of completed processing to a requesting object.

5. The non-transitory computer readable medium of claim 4, wherein the unit of work is part of a multi-step data processing transaction.

6. The non-transitory computer readable medium of claim 1, wherein the network includes:
    b) at least one of the configurable worker objects having the designated application function of cloud services to provide access to and interaction with cloud infrastructures,
    c) at least one of the configurable worker objects having the designated application function of data interaction to provide data transfer between the network and data sources or applications;
    d) at least one of the configurable worker objects having the designated application function of messaging to manipulate, augment, append or route messages passed between the configurable worker objects; and
    e) at least one of the configurable worker objects having the designated application function of output to deliver results to a destination system.

7. An asynchronous, event-driven method for data processing, comprising:
    executing a plurality of configurable worker objects on execution threads;
    detecting an occurrence of an originating event on a computing system;
    selecting, in response to the occurrence of the originating event, a unit of work from a queue; selecting, from the plurality of configurable worker objects based at least in part on an identification script, a network of configurable worker objects available to accept the unit of work, wherein network topology of the network of configurable worker objects is defined in a configuration database containing configuration information for each of the plurality of configurable worker objects, and the network topology includes unidirectional connections between the configurable worker objects in the network such that the unidirectional connections dictate direction of information flow between any two successive configurable worker objects in the network, and wherein each of the configurable worker objects in the network has a software processing unit operable to perform a designated application function and is interoperable with the other configurable worker objects in the network based on the defined network topology, and wherein the network includes at least one of the plurality of configurable worker objects having a designated application function of analytics to provide data processing;

sending the unit of work to a first of the configurable worker objects in the network that encapsulates an application function performed by the software processing unit that is capable of performing a processing task of the unit of work;

processing the unit of work by the first of the configurable worker objects;

indicating, by the first of the configurable worker objects, that the unit of work has been processed.

8. The method of claim 7, further comprising sending the unit of work to a second of the configurable worker objects in the network for further processing.

9. The method of claim 8, further comprising indicating that processing of the unit of work by the first of the configurable worker objects and the second of the configurable worker objects has been completed.

10. The method of claim 9, wherein the process further comprises sending results of completed processing to a requesting object.

11. The method of claim 10, wherein the unit of work is part of a multi-step data processing transaction.

12. A non-transitory computer readable medium including computer program instructions to cause a computing device to perform steps in a process, comprising:

executing a plurality of configurable worker objects on execution threads;

detecting an occurrence of an originating event on a computing system; selecting, in response to the occurrence of the originating event, a unit of work from a queue;

selecting, from the plurality of configurable worker objects based at least in part on an identification script, a network of configurable worker objects available to accept the unit of work, wherein network topology of the network of configurable worker objects is defined in a configuration database containing configuration information for each of the plurality of configurable worker objects, and the network topology includes unidirectional connections between the configurable worker objects in the network such that the unidirectional connections dictate direction of information flow between any two successive configurable worker objects in the network, and wherein each of the configurable worker objects in the network has a software processing unit operable to perform a designated application function and is interoperable with the other configurable worker objects in the network based on the defined network topology, and wherein the network includes at least one of the plurality of configurable worker objects having a designated application function of analytics to provide data processing;

sending the unit of work to a first of the configurable worker objects in the network that encapsulates an application function performed by the software processing unit that is capable of performing a processing task of the unit of work;

determining whether processing of the unit of work by the first of the configurable worker objects depends upon completion of processing by a second of the configurable worker objects in the network; processing the unit of work by the first of the configurable worker objects; and indicating, by the first of the configurable worker objects, that the unit of work has been processed.

13. The non-transitory computer readable medium of claim 12, wherein the process further comprises assigning a transaction identifier to the unit of work.

14. The non-transitory computer readable medium of claim 13, wherein the process further comprises sending the unit of work to a third of the configurable work objects in the network for further processing.

15. The non-transitory computer readable medium of claim 14, wherein the process further comprises indicating that processing of the unit of work has been completed.

16. The non-transitory computer readable medium of claim 15, wherein the process further comprises sending results of completed processing to a requesting object.

17. The non-transitory computer readable medium of claim 16, wherein the unit of work is part of a multi-step data processing transaction.

18. An asynchronous, event-driven method for processing data, comprising:

executing a plurality of configurable worker objects on execution threads;

detecting an occurrence of an originating event;

selecting, in response to the occurrence of the originating event, a unit of work from a queue;

selecting, from the plurality of configurable worker objects based at least in part on an identification script, a network of configurable worker objects available to accept the unit of work, wherein network topology of the network of configurable worker objects is defined in a configuration database containing configuration information for each of the plurality of configurable worker objects, and the network topology includes unidirectional connections between the configurable worker objects in the network such that the unidirectional connections dictate direction of information flow between any two successive configurable worker objects in the network, and wherein each of the configurable worker objects has a software processing unit operable to perform a designated application function and is interoperable with the other configurable worker objects in the network based on the defined network topology, and wherein the network includes at least one of the plurality of configurable worker objects having a designated application function of analytics to provide data processing;

sending the unit of work to a first of the configurable worker objects in the network that encapsulates an application function performed by the software processing unit that is capable of performing a processing task of the unit of work;

determining whether processing of the unit of work by the first of the configurable worker objects depends upon completion of processing by a second of the configurable worker objects in the network;

processing the unit of work by the first of the configurable worker objects; and indicating, by the first of the configurable worker objects, that the unit of work has been processed.

19. The method of claim 18, further comprising assigning a transaction identifier to the unit of work.

20. The method of claim 19, further comprising sending the unit of work to a third of the configurable work objects in the network for further processing.

21. The method of claim 20, further comprising indicating that processing of the unit of work has been completed.

22. The method of claim 21, further comprising sending results of completed processing to a requesting object.

23. The method of claim 22, wherein the unit of work is part of a multi-step data processing transaction.

\* \* \* \* \*